(12) United States Patent
Geller et al.

(10) Patent No.: US 9,195,979 B2
(45) Date of Patent: *Nov. 24, 2015

(54) GOLD AND PRECIOUS METAL BUYING MACHINE AND METHOD

(71) Applicant: Nakia Geller, Sunrise, FL (US)

(72) Inventors: Nakia Geller, Sunrise, FL (US); Johnny Gregg Ellis, Melbourne, FL (US)

(73) Assignee: Nakia Geller, Coconut Creek, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/856,217

(22) Filed: Apr. 3, 2013

(65) Prior Publication Data
US 2014/0304156 A1      Oct. 9, 2014

Related U.S. Application Data

(63) Continuation-in-part of application No. 13/466,647, filed on May 8, 2012, now Pat. No. 9,070,148.

(60) Provisional application No. 61/618,540, filed on Mar. 30, 2012.

(51) Int. Cl.
*G06Q 40/00* (2012.01)
*G06Q 20/18* (2012.01)
(Continued)

(52) U.S. Cl.
CPC ............... *G06Q 20/18* (2013.01); *G06Q 20/34* (2013.01); *G06Q 20/40145* (2013.01);
(Continued)

(58) Field of Classification Search
CPC ... G06Q 30/06; G06Q 40/04; G06Q 30/0237; G07F 19/20

USPC ...................................................... 705/35–45
See application file for complete search history.

(56) References Cited

U.S. PATENT DOCUMENTS 3,060,724 A * 10/1962 Smith, Jr. et al. .............. 73/32 R
6,131,085 A    10/2000 Rossides
(Continued)

FOREIGN PATENT DOCUMENTS

JP           59108167        6/1984
JP         2002109428        4/2002
(Continued)

OTHER PUBLICATIONS

"Densities of the Elements", 2006, Wikipedia.*
(Continued)

*Primary Examiner* — Stephanie M Ziegle
*Assistant Examiner* — Michael W Anderson
(74) *Attorney, Agent, or Firm* — Robert C. Kain, Jr.

(57) ABSTRACT

The gold and precious metal buying machine and method has a housing, a vault and inboard processing stations for: weighing, detecting constituent elements with x-rays and measuring volume based upon gas or fluid displacement. Weight, elemental data and volume is used to calculate gold weight and discounted market value based upon exchange rate, gold weight and a discount factor. Market value is displayed and if accepted, the system generates payment instruction and vault storage command. A rejection negates the acceptance upon request or error signal and generates rejection command. Machine transports item to various stations and, upon the storage command to the vault, and upon rejection to the item return port in the housing. An air displacement test uses a processor measuring a differential volume and a chambered item at a different pressure by a differential position of a piston movable in the chamber.

17 Claims, 17 Drawing Sheets

(51) Int. Cl.

| | | |
|---|---|---|
| *G06Q 40/04* | (2012.01) | |
| *G06Q 30/06* | (2012.01) | |
| *G07F 19/00* | (2006.01) | |
| *G06Q 20/34* | (2012.01) | |
| *G06Q 20/40* | (2012.01) | |
| *G07D 11/00* | (2006.01) | |
| *G07F 7/00* | (2006.01) | |

(52) U.S. Cl.
CPC ....... *G06Q 30/0601* (2013.01); *G06Q 30/0607* (2013.01); *G06Q 40/00* (2013.01); *G06Q 40/04* (2013.01); *G07D 11/009* (2013.01); *G07F 7/00* (2013.01); *G07F 19/202* (2013.01)

(56) References Cited

U.S. PATENT DOCUMENTS

| | | | |
|---|---|---|---|
| 6,415,271 | B1 | 7/2002 | Turk et al. |
| 7,752,108 | B2 | 7/2010 | Pratt et al. |
| 7,844,547 | B2* | 11/2010 | Amos ............................ 705/43 |
| 8,015,089 | B1 | 9/2011 | Baya'a et al. |
| 8,429,021 | B2* | 4/2013 | Kraft et al. .................... 705/26.1 |
| 2009/0296566 | A1* | 12/2009 | Yasrebl et al. ................. 370/221 |
| 2010/0223127 | A1 | 9/2010 | Bettez et al. |
| 2011/0047062 | A1* | 2/2011 | Kerschner et al. .............. 705/37 |
| 2011/0060655 | A1 | 3/2011 | Novak et al. |
| 2011/0071668 | A1 | 3/2011 | Lin et al. |

FOREIGN PATENT DOCUMENTS

| | | |
|---|---|---|
| KR | 20090093225 | 9/2009 |
| KR | 20090093231 | 9/2009 |
| WO | WO-2004/001562 | 12/2003 |
| WO | WO-2011/013942 | 2/2011 |
| WO | WO 2011/022424 | 2/2011 |
| WO | WO-2011/078765 | 6/2011 |

OTHER PUBLICATIONS

Spec for Olympus Innov-X, Delat XRF Analyzer (Model DI-2000 cc), Olympus Sales in Woburn, Mass.

* cited by examiner

GOLD AND PRECIOUS METAL BUYING MACHINE AND METHOD

This is a continuation in part patent application based upon and claiming the priority of Ser. No. 13/466647, filed May 8, 2012, and provisional patent application Ser. No. 61/618,540, filed Mar. 30, 2012, the contents of which are incorporated herein by reference thereto.

The present invention relates to a gold buying and method and a precious metal buying machine and method.

Consumers and customers oftentimes have gold bearing items such as jewelry, fanciful dinner plates, coins and other items, as well as other types of items made of precious metals (silver and platinum). Some of these customers may wish to sell these items in a secure manner with some confidence that the price is based upon an exchange rate market price for the gold or the precious metal. The present invention solves this problem.

U.S. Pat. No. 7,844,547 to Amos discloses a kiosk permitting consumers to buy and sell gold. The kiosk has a receiving slot for gold bullion and gold coin. Gold and jewelry placed in the kiosk can be assayed with electrical and thermal conductivity, MRI or X-rays. However, Amos does not give further details of how the assay process is done on the gold and jewelry.

Published PCT Patent Application, WO 2011022424 to Kerschner discloses a system for managing gold bullion transactions at a consumer-operated kiosk by paying a transaction price when receiving authenticated gold bullion or when gold bullion is sold to a customer.

Published Japanese Patent JP 2002109428 discloses a gold exchange that exchanges gold of predefined weight for currency, and connecting the gold buying machine to a central office to determine the market price of gold at the time of settlement.

Published Japanese Patent JP 59108167 discloses unattended ATM machine with access chamber for gold bullion.

U.S. Pat. No. 6,415,271 to Turk et al. discloses asset-based electronic cash system for financial transactions whose total value is equal to the stored amount of valuable commodity.

U.S. Pat. No. 7,752,108 to Pratt et al. discloses asset-backed purchasing module to debit the consumer account by selling quantity of asset backing purchase account balance to house account.

Other U.S. patent and patent application references that may be relevant are: U.S. Pat. No. 6,131,085 to Rossides entitled Answer Collection and Retrieval System Governed by a Pay-OffMeter; U.S. Pat. No. 8,015,089 to Baya'a et al. entitled System and Method for Providing a Pre-Paid Commodity-Based Credit Account; U.S. Published Patent Application No. 2011/0071668 to Lin et al. entitled Vending Machine Monitoring System and Its Monitoring Method; U.S. Published Patent Application No. 2011/0060655 to Novak et al. entitled Currency Market Utilizing Precious Metals and Gemstones; U.S. Published Patent Application No. 2010/0223127 to Bettez et al. entitled Method and Apparatus for Managing Shipping and Advertisement Information in a Communications environment; Korean Published Patent Appln. KR 20090093231; Korean Published Patent Appln. KR 20090093225; Published PCT Patent Application, WO 2011078765 entitled Interactive Kiosk; Published PCT Patent Application, WO 2011013942 entitled Automatic Gold Bar Vending Machine; and Published PCT Patent Application, WO 2004001562 entitled Systems and Methods for Storage of User Information and for Verifying User Identity.

OBJECTS OF THE INVENTION

It is an object of the present invention to provide a gold buying machine capable of buying a number of gold bearing items and a similar machine for buying items containing other precious metals. A method is also presented herein.

It is a further object of the present invention to provide a gold buying machine which presents the price or offer to buy prior to the consumer accepting the offer.

It is another object of the present invention to provide a gold buying machine and a method and a precious metal buying machine and method wherein the offer to buy presented to the consumer is based upon the exchange rate market price less a transaction or discount fee. The transaction fee accounts for size, weight and volume errors, the presence of jewels, as well as fraud, theft and other system costs.

It is another object of the present invention to provide a gold buying machine and a precious buying machine which reduces fraud by capturing user supplied data based upon questions presented to the user at the seller interface module. The seller's interface module includes a display screen, keypad, fingerprint reader, multiple cameras, credit card and driver license readers, and audio announcer systems. Voice print recorder may also be used.

The system is also programmable to capture customer data based upon local ordinances governing pawn shop operations.

It is another aspect of the present invention to provide an x-ray analysis to identify elements in the piece subject to the "buy event" and also measure the volume of the piece, using air (or another gas) or fluid displacement techniques, and processing the resulting data to ascertain the weight of gold (or silver) in the piece subject to the "buy event."

It is a further object of the present invention to alloy an algorithm to the resultant of the elemental analysis and the volume measurement to calculate, within some acceptable range of error, the percentage of gold in the piece offered for sale by the user.

It is another object of the present invention to use an air (or other gas) displacement and volume measurement test to ascertain the volume of the piece offered for sale.

SUMMARY OF THE INVENTION

The machine and the method for buying gold-bearing items (or other items made of precious metal) from consumers includes a secure housing with an internal vault. The machine is coupled via a telecommunications link to a central office which tracks the purchase of gold-bearing items at the machine and tracks related transactions (attempts to sell gold items at the machine) and provides updates relative to the exchange rate market price data for gold. The housing includes a portal leading inboard to a processing platform which holds the gold or precious metal bearing item. A plurality of processing stations are disposed in the interior of the housing. A lock-out door closes the portal during item processing.

The plurality of processing stations include: a weigh station to weigh the gold-bearing or precious metal-bearing item, an imaging station for capturing images of the item, an assaying station for testing a purity of gold in the item, and a conveyor or routing transport system for delivering a purchased item to the vault. The weigh station, imaging station and assaying station respectively generate representative signals for weight, item images and assaying data. A plurality of seller interface modules are disposed on the exterior of the housing including a display, an imaging system to capture one or more images of the seller, at least one scanner for obtaining seller's identity and biometric data, a keypad input interface and a bank card reader adapted to read the seller's bank card.

The seller's bank card is linked to the seller's account which, if the sale is consummated, is credited after the gold-bearing item is deposited in the vault.

A control computer processor electronically obtains the respective weight, item images and assaying signals from the processing stations. The processor is mounted in the secure housing. The control processor includes: a communicator for facilitating communication with the central office to obtain current exchange rate data for the gold; a calculation module for determining a discounted market value for the gold-bearing item based upon the exchange rate data, and the weight signals, a purity based upon the assaying data, and the discount factors; and an interface for activating the user's display. The display shows instructions to the user regarding acceptance and rejection of the offer to buy, and the offer to buy the item at the determined or calculated market value (discounted from the calculated exchange rate value).

A compiler operative with the processor stores seller's data obtained from the seller interface modules including seller responsive data (responsive to the displayed offer to buy), seller images and scanner data for seller's identity and biometric data. The compiler also stores transactional data. An acceptance module initiates a credit event for the seller's account based upon the seller's confirmation of sale. The conveyor or router delivers the purchased item to the vault in the secure housing. If the user does not sell the item (rejects the offer to buy), a rejection module negates the acceptance module. A rejection also is initiated when an error signal is detected. An error module generates an error signal based upon one or more of: a gold purity fault, a weight fault, a discounted market value fault, and an item size fault. The rejection module facilitates the return of the item to the user.

In another embodiment of the present invention, the machine for buying the gold-bearing item or precious metal bearing item includes a housing with a vault. A portal in the housing leads inboard to a plurality of processing stations in the interior of the housing. The items are placed in the portal. The processing stations include a weigh station, to weigh the item and generate weight data, an x-ray spectrometer station which detects constituent elements present in the item and generates elemental data, and a volume measurement station measuring the volume of the item based upon gas or fluid displacement in a chamber with the item. The volume measurement station generates volume data. A computer processor electronically obtains the weight data, the elemental data (gold, precious metal and other metal elements) and the volume data and approximately calculates the amount of gold by weight in the item. The processor determines a discounted market value for the gold-bearing item based upon predetermined exchange rate data, the gold weight and at least one discount factor. The processor also engages a display of the discounted market value to the customer. An acceptance module accepts an "offer to sell" instruction from the customer and thereafter generates a payment instruction to compensate the customer and generates a vault storage event command. A rejection module negates the acceptance module upon either a customer's request or a detected error signal. The rejection module generates a rejection command. An error module generates the error signal based upon either a gold purity fault or a weight fault. The machine includes a transport system delivering the item to the weigh station, to the spectrometer station, to the volume measurement station and, upon the vault storage event command to the vault, and upon the rejection command to the return port in the housing. Preferably, the volume measurement station is an air or gas displacement appliance with a chamber of known volume, and a processor for measuring a differential volume from the known volume at the predetermined pressure and the chambered item at a different predetermined pressure by measuring by a differential position of a piston movable in the chamber.

The method for buying the gold-bearing item or previous metal item from a consumer includes: weighing the item and generating representative weight data for the item; x-raying the item with a spectrometer, detecting constituent elements and generating elemental data; and measuring a volume of the item with a gas or fluid displacement method and generating volume data for the item. The computer-based processing obtains data, and calculates the amount of gold by weight, determines a discounted market value, and displays the discounted market value. The method accepts an offer to sell instruction, generates a payment instruction and a vault storage event command. Sometimes, the method rejects the acceptance based upon a customer request or an error signal and generates a rejection command. The item is transported to the vault in the presence of the vault storage event command or to the customer in the presence of the rejection command.

BRIEF DESCRIPTION OF THE DRAWINGS

Further objects and advantages of the present invention can be found in the detailed description of the preferred embodiments and in the illustrated drawings of the preferred embodiments of the invention.

DETAILED DESCRIPTION OF THE PREFERRED EMBODIMENTS

The present invention relates to a gold buying and precious metal buying machine and a computerized system for tracking the sales and updating buying parameters in a plurality of remote buying machines. Although reference is made herein to a "gold buying machine" or "GBM" the machine, system and process can be employed with other previous metals. Therefore, the reference to a "gold buying machine" or GBM is not limited to gold items but the GBM also operates on precious metal items.

The general features and functions of the GBM machine are as follows. (1) Customer places gold-bearing item ("gold") into a Gold Buying Machine ("GBM"), a solid, secure machine like an ATM or automatic teller machine; (2) Gold is dropped or shuttled to a "Weigh+Exam" plate or bowl; (3) At the W-E station or stations, the gold is weighed and a x-ray image or images are obtained of the gold piece. Prior to the x-ray analysis, the piece is grabbed or gripped, and then a jeweler's file is used to make a small cut on the surface of the piece. The x-ray gun and x-ray processing system uses the small file slot to detect the percent % gold of the piece under study; (4) The x-ray is used to assay the gold. A computer algorithm (i) obtains current local price per weight (14K standard) (Internet access); (ii) the computer system or processor in GBM calculates the price of the gold accounting for % gold per unit weight; (iii) the GBM computer discounts "offer to buy gold" to account for transaction costs, fraud, commissions, etc.; (iv) GBM machine displays the discounted "offer to buy" gold and customer accepts/declines offer. If a BUY, GBM machine dispenses cash or initiates a credit event (issues credits) on a customer's debit card or credit card. GBM then places the gold piece or item in a secure vault in the interior of the GBM. If NO BUY, then GBM returns item to customer; (5) The GBM has the following data processing items: (i) obtain customer fingerprint, photo and scan customer id, such as a driver's license; (ii) obtain customer profile data (requires data input from customer); (iii) customer completes local law "gold purchase" log sheet (Q: is gold stolen?; are you a felon?, etc); (iv) large gold items rejected (returned) to customer as "too big"; (v) thick gold items rejected (returned to customer) due to "fraud by weight" tricks.

Figure 1:
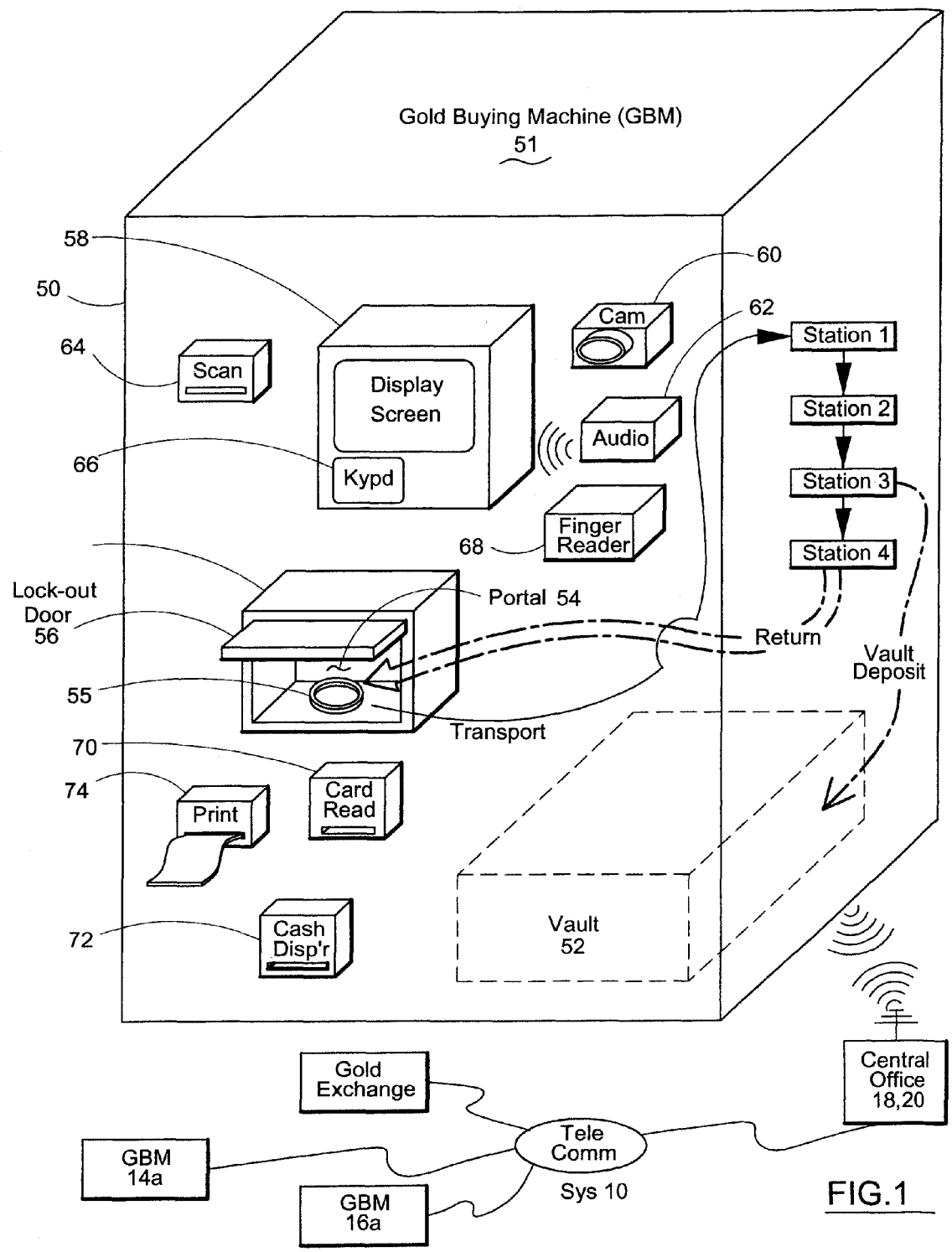
FIG. 1 diagrammatically illustrates the gold buying and precious metal buying machine with operational modules.

FIG. 1 diagrammatically illustrates a gold buying machine GBM 51 which can also be configured as a precious metal buying machine. Housing 50 is designed to be secure and difficult to break into. Vault 52 is disposed in an interior location within housing 50. Housing 50 includes an opening or portal 54 into which a consumer or user places an item 55 subject to a potential purchase. Portal 54 has a lockout door 56 which closes and thereby secures item 55 within the machine for processing. The door closes before any processing function.

Machine 50 includes a plurality of seller interface modules. Examples of these modules includes display screen 58, a camera 60 which captures an image or images of the seller (multiple cameras may be used), an audio announcer or speaker 62, an identity (Id.) card scanner 64, a keypad 66 which permits the user to input items and a fingerprint reader 68. Keypad 66 may be a discrete unit or may be part of a touch screen display as part of display screen 58. Scanner 64 is configured to scan various seller identity cards (driver's license) as well as a seller's bank card. Reference to a "bank card" includes a credit card, debit card or any other financial card issued by a financial institution. From an operational standpoint, a seller's account associated with a bank card will be credited at the time of sale of the item by GBM buying machine 51.

The seller interface module may also include a separate credit card or bank card reader 70, a cash dispenser 72 and a printed material dispenser 74. All these items are explained later in their operational setting. The printer 74, display 58, camera 60 and user input (66 or touch screen 58) are important parts of the seller interface module group.

Once gold or precious metal bearing item 55 is placed on a processing platform within housing 50, in one embodiment, the item 55 is transported to a variety of processing stations, stations 1, 2, 3 and 4. Reference is made herein to "gold bearing item" but this reference also covers other precious metal items. If the consumer does not accept the offer to buy, item 55 is returned as noted by the return path of the dash dot dash double lines. If the seller agrees and confirms the sale, the item 55 is delivered to vault 52 within buying machine 51.

Figure 7:
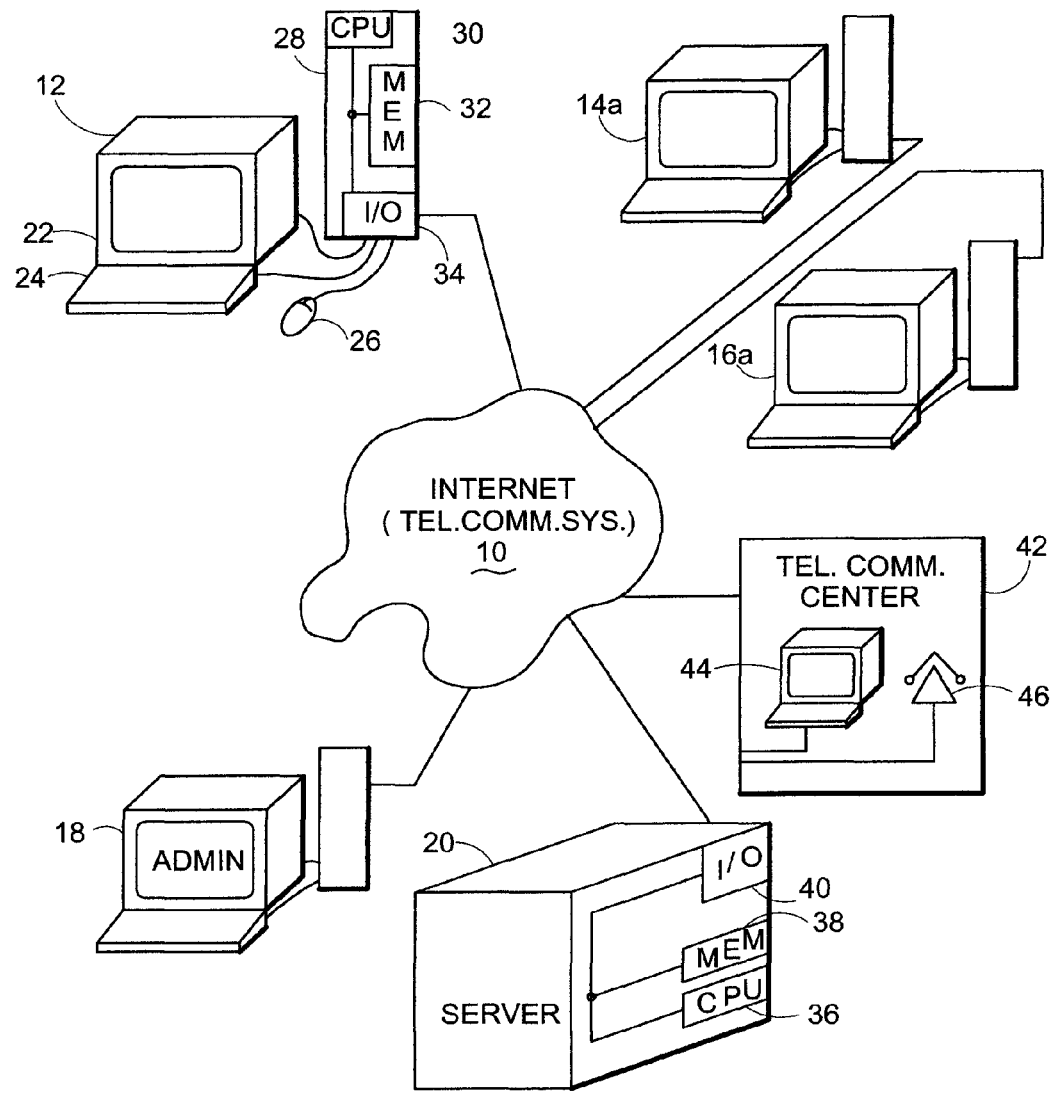
FIG. 7 diagrammatically illustrates the computerized network which is tied to the gold and precious metal buying machine.

In order to provide up to date data regarding exchange rate market prices and in order to track transactions, buying machine 51 has a telecommunications link with central office 18, 20 (described in the summary in connection with FIG. 7 that follows). Central office 18, 20 is coupled to telecommunications system 10 and other GBM machines 14a and 16a. Further, the telecommunications system 10 is coupled to a gold exchange data center which generates exchange rate market price data for the system. Of course, rather than having a gold buying machine, the machine may be expanded to include other precious metals.

Figure 2:
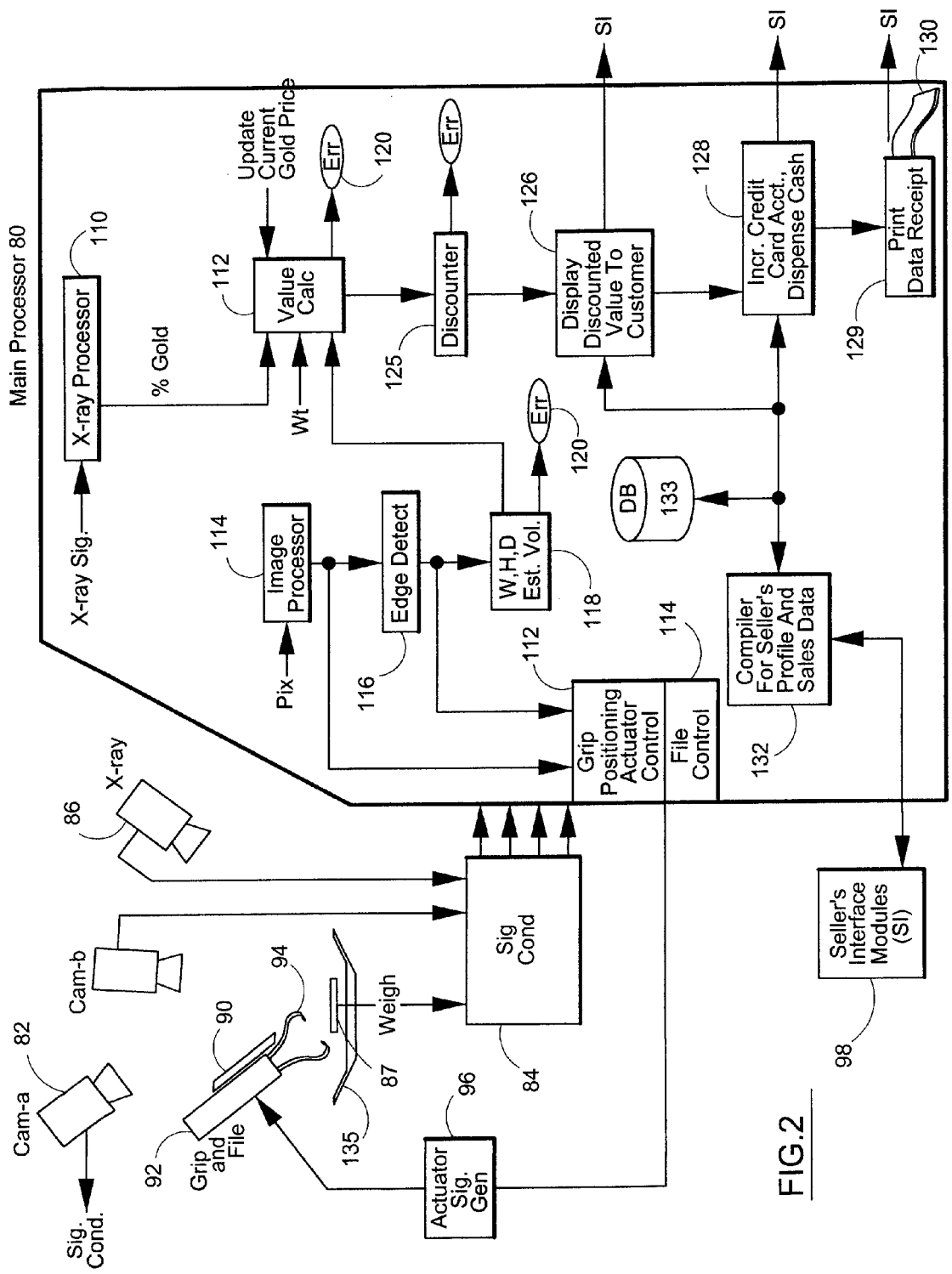
FIG. 2 diagrammatically illustrates other functional modules in the gold buying and precious metal buying machine.

FIG. 2 diagrammatically illustrates certain hardware and electronic modules utilized by buying machine 51.

Main computer processor 80 is disposed inside housing 50. Various signals from camera—A, identified as camera 82, as well as the output signals from camera—B are fed to signal conditioner 84. In order to assay the item and determine the amount of gold and other precious metal, an X-ray imaging system 86 is utilized. The output from X-ray system 86 is fed to signal conditioner 84. In order to convert and obtain the market value of the item under study, the item is weighed as noted by weigh scale or weighing device 87. The output from weight scale 87 is applied to signal conditioner 84. By using X-ray imaging system 86, the item under study is first gripped and then a small slot or groove is filed in the item. A jewelers file 90 is deployed on the grip and file module 92. Grip arms 94 initially grip the item and file 90 is then moved across and over the item. Thereafter, X-ray sub-module 86 takes an X-ray picture and generates assay data signals which are applied to signal conditioner 84. The grip and file unit 92 is controlled by an actuator signal generator 96. Generator 96 controls the grip action and the file action. Robotics modules are employed in this manner. With respect to main processor 80, the processor obtains many of the inputs from the seller interface module 89. Processor 80 interacts with module 89. As explained earlier, this module 89 includes display 58, keypad 66, ID scanner 64, fingerprint reader 68, camera 60, audio speaker 62, printer 74, bank card reader 70 and potentially cash dispenser 72. The inputs and control of the seller interface module 89 is established by main processor 80.

Outputs from signal conditioner 84 are fed through various functional modules. The functional modules may be software, hardware or a combination. X-ray processor 110 obtains the X-ray signal from conditioner 84 and determines the percentage gold by a known method. Value calculator 112 accepts as an input the percentage gold factor (potential a carat signal), as well as the weight signal from weigh station 87. Further, value calculator 112 obtains an update for the exchange rate market price for the gold piece or precious metal piece. As explained later, this is generated from the central office. Image processor 114 obtains gold bearing item 55 images PIX from camera CAM-A and CAM-B as well as seller interface camera 60 (FIG. 1). These images are processed. Particularly an edge detection routine 116 processes the image of the item 55. The edge detection is used in robotics control (grip and file 92) and item volume calculations. In module 118, an estimate volume is computed based upon item images. The width, height and depth of the item is studied, detected and processed to obtain an estimated volume value. Other image processing techniques may be used to detect width, height and depth, as well as the volume of item 55. The cameras may be visual, IR or uv. The x-ray image may be used for volume calculation and robotic control. If the item is too small, an error signal by processor 80 is generated as noted by error module 120. If the item 55 is too large either by weight, height, width or depth, an error signal is generated. These error signals are stored in the database along with the seller information. This is part of the anti-fraud prevention of the present invention (especially for weight fraud). Other image processing techniques may be employed such as a color filters in order to locate the edges and determine depth or identify jewels. Further, a number of cameras may be employed rather than one or two as shown in the drawings in order to obtain a complete picture of the item subject to the sell. In a customer dispute, these images are useful for dispute resolution.

Processor 80 includes a grip positioning and an actuator control 112 as well as a file control 114. The output from grip actuator control 112 and file control 114 is applied to actuator signal generator 96 and ultimately the commands to grip the item and file the item are applied to grip and file module 92. The commands initiate from the processor.

Once the item under study has a small slot file on it, an X-ray image is taken and this data is ultimately applied to value calculator 112. The value calculator is a determining device for determining the discounted market value for the gold bearing item based upon the exchange rate data, the weight signal obtained by weighing the item, and the purity based on the assaying data from module 110 and further discount factors. These further discount factors include transaction fees; fraud related discounts and other items discussed later herein. For example, the presence of non gold elements (jewels) on a gold plated bearing item increases the discount fee. Additional image processing may be employed by main processor including the use of color detection and color filters and imaging algorithms known to persons of ordinary skills in the art.

As an example of fraud, if the estimated volume, coupled with a gold weight per volume factor (multiple factors for 14K, 12K etc.) reveals a result which is significantly different (beyond a differential threshold) than the actual weight of the item, that is an indication of fraud by the consumer. For example, lead has a higher density compared to gold and this error is detected by the GBM. In such a situation, the error routine 120 is activated and the item is returned to the user. Otherwise for a buy cycle, discount unit 125 applies the discount to the true or actual exchange rate market price of item 55. This discount may be permanently stored in buying machine 51 or may be supplied periodically by central office 18, 20. There may be a table of discount factors accounting for size, weight, purity, number of jewels, etc. or a discount matrix (weight vs. category (size, type of item (see list)) vs. assayed purity) may be used. Module 126 displays the fully discounted offer to buy to the customer. Typically, this display occurs on display screen 58. If the customer confirms the purchase via keypad 66 or other mechanism, the system affects a credit to be issued to the seller's account linked to the seller's bank card. Module 128 recognizes that there is an incremental credit applied to the credit account of the user or the seller. In some situations, GBM 51 may pay out cash from cash dispenser 72. Module 129 recognizes that a print receipt 130 documents the transaction for the customer. With respect to the display discount value, display incremented credit account, and print, those data functions are all applied by processor 80 to seller interface 98 described earlier in connection with FIG. 1.

However, prior to presenting an offer to buy, the seller must input significant information about himself or herself into GBM 51. Compiler unit 132 gathers all the seller's profile data, from ID scanner 64, fingerprint reader 68, keypad 66 and others. The data is stored in a compiler data base 133 or memory unit. Further, the buying machine 51 may display questions on display screen 58 which are compelled by the federal or local government. For example, questions regarding: "Is this a stolen item? Are you a convicted felon? Has this item been previously sold to a pawn shop?" are all potential government required questions. The seller's responses are collected via a keypad or other mechanism and ultimately are stored in compiler 132.

Figure 3:
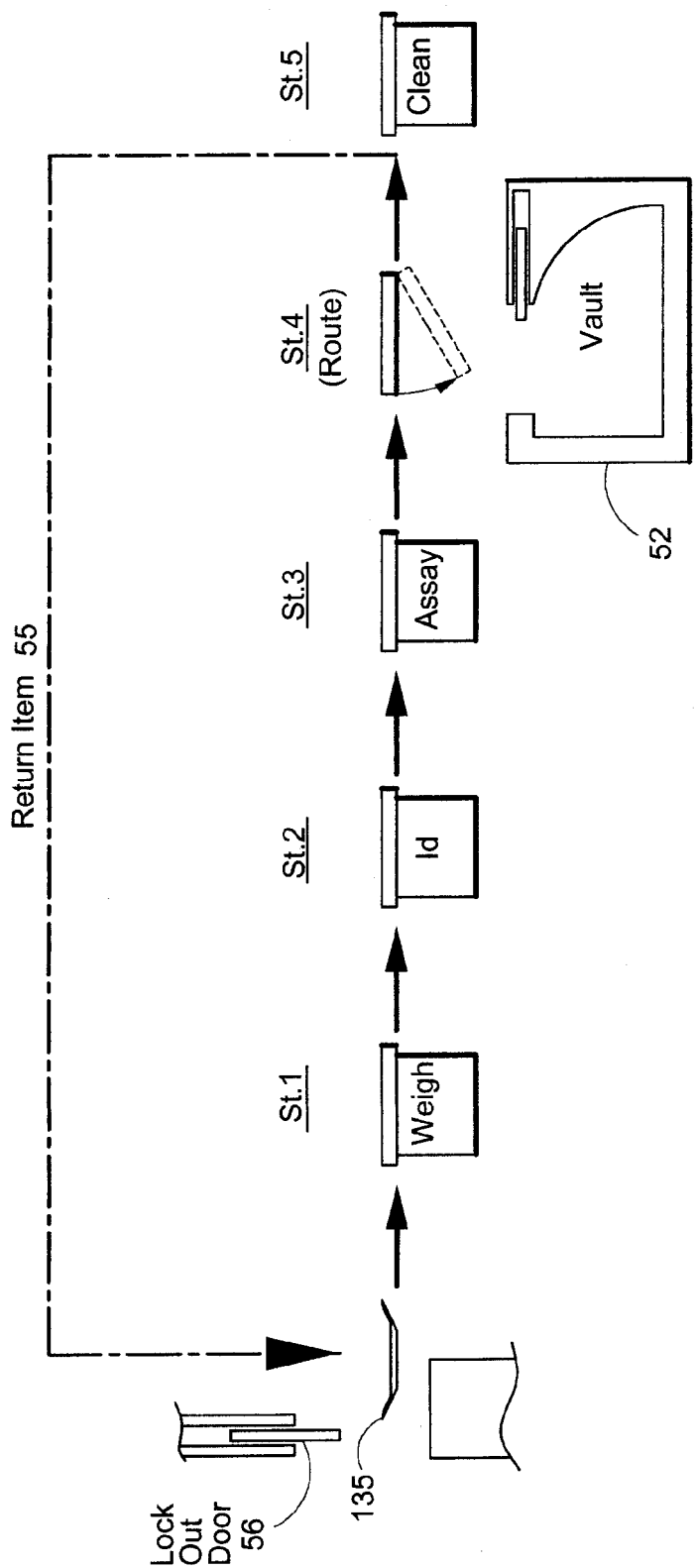
FIG. 3 diagrammatically illustrates stations which process the item subject to the purchase.

FIG. 3 diagrammatically shows one methodology for operationally processing the item 55 subject to the transaction. Once door 56 is opened (door 56 is normally closed), the user can place the item subject to the potential sale onto a processing platform 135. This processing platform 135 may move through a defined track within housing 50. Station 1 is a weigh station. Station 2 identifies the item subject to the purchase. Station 3 is an assay station where the gold value or other precious metal value is determined. Station 4 is a routing station wherein either the item is placed in vault 52 or the item is returned by return item path to the portal 54 and lockout door 56. Generally during processing, lockout door 56 is closed. Once the item is returned, door 56 is open and the user can withdraw the item from the machine. Step 5 is a cleaning station such that gold dust or other material caused by creating the small slot in item 55 is removed from the processing platform 35.

Figure 4:
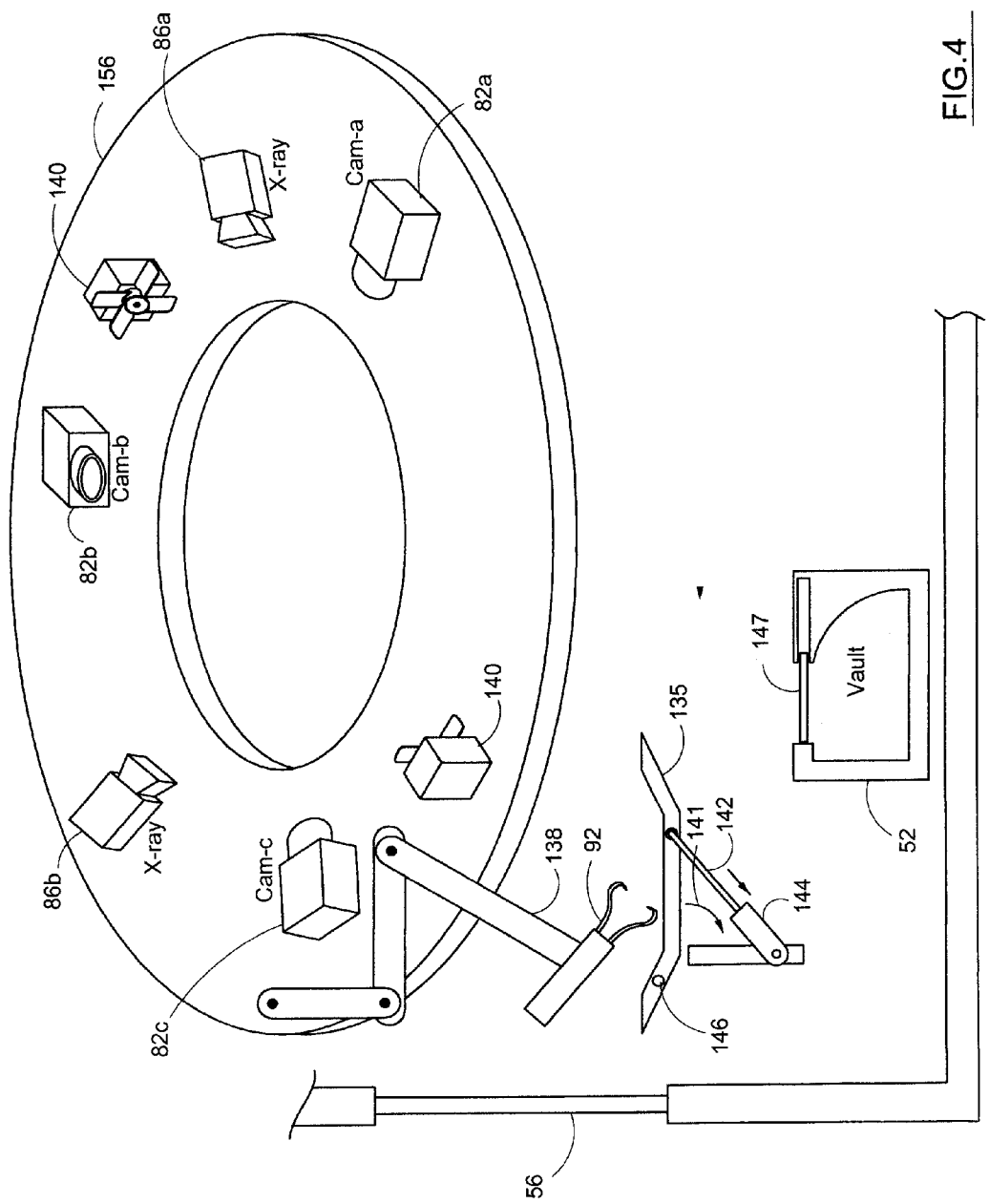
FIG. 4 diagrammatically illustrates a different configuration for the stations wherein the item is stationary.

FIG. 4 shows a different configuration for the processing stations. Other processing methods, different than FIGS. 3 and 4, may be used. In FIG. 4, processing platform 135 is near lockout door 56. In FIG. 4, the working modules are mounted above plate 135 on an elevated operating platform 156. Typically, grip and file unit 92 is disposed well above lockout door 56 by withdrawing articulating arms 138. Above the operating theater of processing platform 135 is a plurality of items including item cameras 82a, 82b and 82c. Further, two X-ray imaging systems 86a, 86b are utilized. In order to clean the processing platform 135, clean air blowers or fans 140 are disposed above on platform track 156. In order to deliver the item to the vault, platform 135 rotates downward as shown by arrow 141. This is caused by actuator arm 142 being drawn into actuator body 144. Processing platform 135 rotates as shown by arrow 141 about pivot point 146. Any item 55 on the platform will be dropped into the interior of vault 52 while the vault door 147 is open. The elevated operating platform track 156 may be stationary or may rotate to better position the functional modules near item 55 on platform 135.

Figure 5:
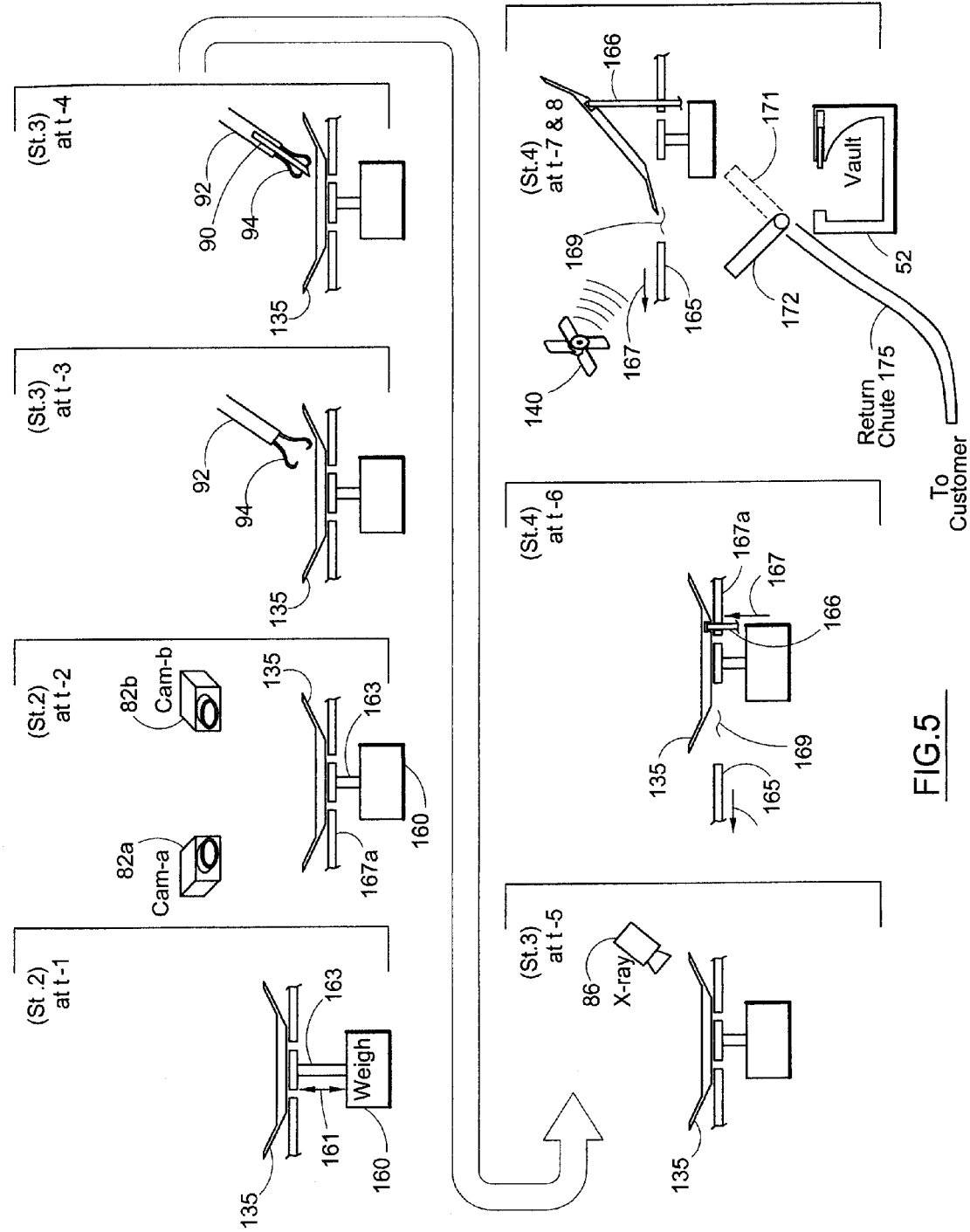
FIG. 5 diagrammatically illustrates time based processing of the item subject to the potential purchase.

FIG. 5 diagrammatically illustrates the process and the stations spaced apart in time rather than physically spaced apart. Station 1 at time t-1 notes that processing platform 135 retains the item 55 (not shown) and weigh module 160 is weighing the goods 55. The weigh platform 163 for weigh module 160 is raised to weigh platform 135 and item 55 by up and down movement 161 of weigh module 160. At station 2 at time t-2, images of the item 55 are taken by cameras 82a, 82b. At that point, the plunger 163 for weigh unit 160 has been retracted below the plane established by base 167a.

At station 3 and time t-3, the imaging cameras are used to guide the grip unit 92 to a position close to the item (not shown) such that grip arms or fingers 94 can grip the item. At station 3, time t-4, a jewelers file 90 is utilized to file a small slot in the jewelry piece of the study. File 90 moves back and forth as shown by arrow 139.

A station 3 at time t-5, an X-ray image by X-ray camera 86 is taken. The image is taken of the slot created by the jewelers file in order to determine the quality of gold in the item (carat value). The slot enables the jeweler and the X-ray gun 86 to penetrate the surface in order to determine how deep the gold is and hence how valuable the item is. Also, the filing operation identifies gold plated items.

At station 4, time t-6, the assay step has been completed and the user has confirmed the sale to the system operator of GBM 51. The system operator is the party operating the buying machine 51. In one embodiment, a lower support wall 165 is moved as shown by arrow 167 leaving a space 169 open. A pin or rod 166 is raised above the support platform 167a thereby lifting one end of operating platform 135.

At station 4, time t-7, processing platform 135 has been fully extended to a near vertical position due to the upward movement of push rod 166. Space 170 has been opened in the base platform to permit the item under study (the assayed piece) to fall down into a routing system created by route lever arm 172. As shown in FIG. 5, route door or arm 172 causes any item passing through opening space 170 to fall into vault 52. In another mode of operation, wherein route door 172 moves to the dashed position 171, the item under study is transported via return chute 175 to the customer. Vault 52 has a door which is opened upon extension of rod 166 and closed upon delivery of item 55 in the vault space. Imaging cameras may confirm delivery of the item into the vault.

Figure 6A:
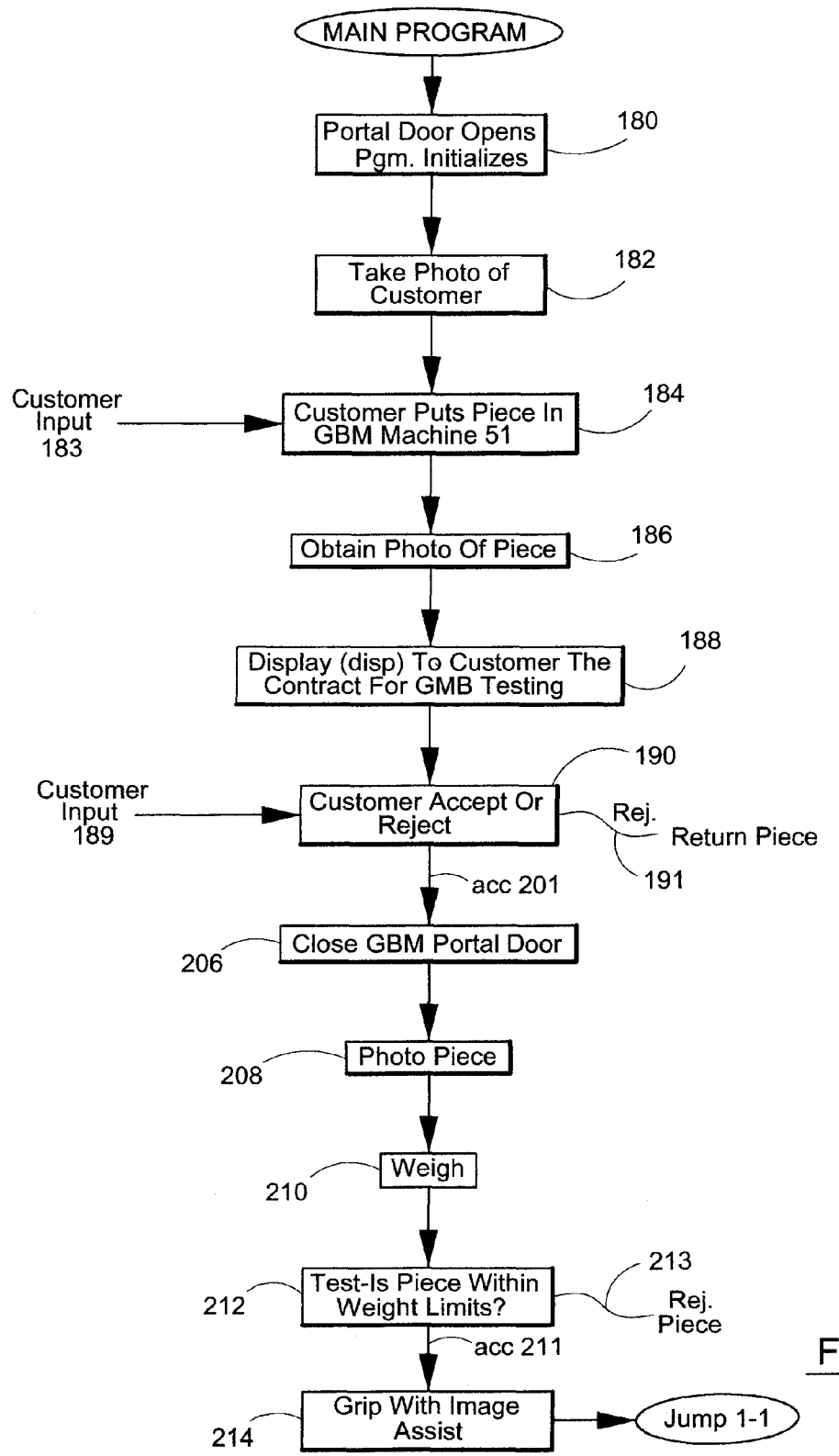
FIGS. 6A-D diagrammatically illustrate several operational flowchart.

FIG. 6A diagrammatically illustrates functional operational blocks for the general operation of the present gold and precious metal buying machine and method. The flowchart consists of FIGS. 6A, 6B, 6C and 6D. The programs are linked together by jump points 1-1, 1-2 and 1-3 in the various figures.

In step 180, the program initializes and the portal door 56 opens. In step 182, a photograph or image of the customer depositing the item under study 55 into the portal 54 is taken. In this manner, anti-fraud provisions are developed by the program, machine and method. In step 184, the customer puts the piece under study in the gold buying machine (GBM machine) that is, gold and precious metal buying machine 51. A customer input 183 is noted as the customer deposits item 55 into the operating platform through portal 54. In step 186, the system obtains an image or photo of the item. This is used in order to avoid fraud and to further document exactly what is placed in the machine for assaying. The image is stored with the customer profile ID data. Step 188 displays to the customer the contract for the GBM testing. As noted earlier, the piece under study is slightly altered in order to determine the gold or precious metal content. The customer should agree to the GBM contract before such activity. Step 190 accepts customer input 189 wherein the customers accepts or rejects the contract. If rejected, step 191 returns the piece to the customer by opening lockout door 56. Earlier, immediately after step 184, the lockout door 56 would be closed thereby securing the piece within machine 50. If, in step 190, the customer accepts the contract, the acceptance path 201 is followed and, in step 206, the machine closes lockout door 56. As described earlier, this could be an alternative to closing the lockout door after step 184. In step 208, the machine takes another image of the piece under study. Step 210 involves obtaining the weight of the item under study. Step 212 is a test to determine whether the piece under study falls within weight limits. These minimum and maximum weight limits are discussed later. If the piece under study is not within the minimum and maximum thresholds or predetermined limits, rejection REJ step 213 is engaged and the piece is returned to the customer. If the piece under study falls within the minimum and maximum weight limits, acceptance ACC path 211 is followed. In step 214, the machine grips the item with assistance of the image.

With a high quality image and, more importantly, multiple images of the item under study taken by several cameras in the machine, computer program software and hardware can detect the edges of the image and the shape of the image. A computation of shape and size and volume can be made. The volume may be estimated since the discount rate accounts for volume errors. With the computation of shape and size, a mechanical arm can be directed to grab the piece or grab several segments of the piece under study in order to secure the piece for the filing operation.

Figure 6B:
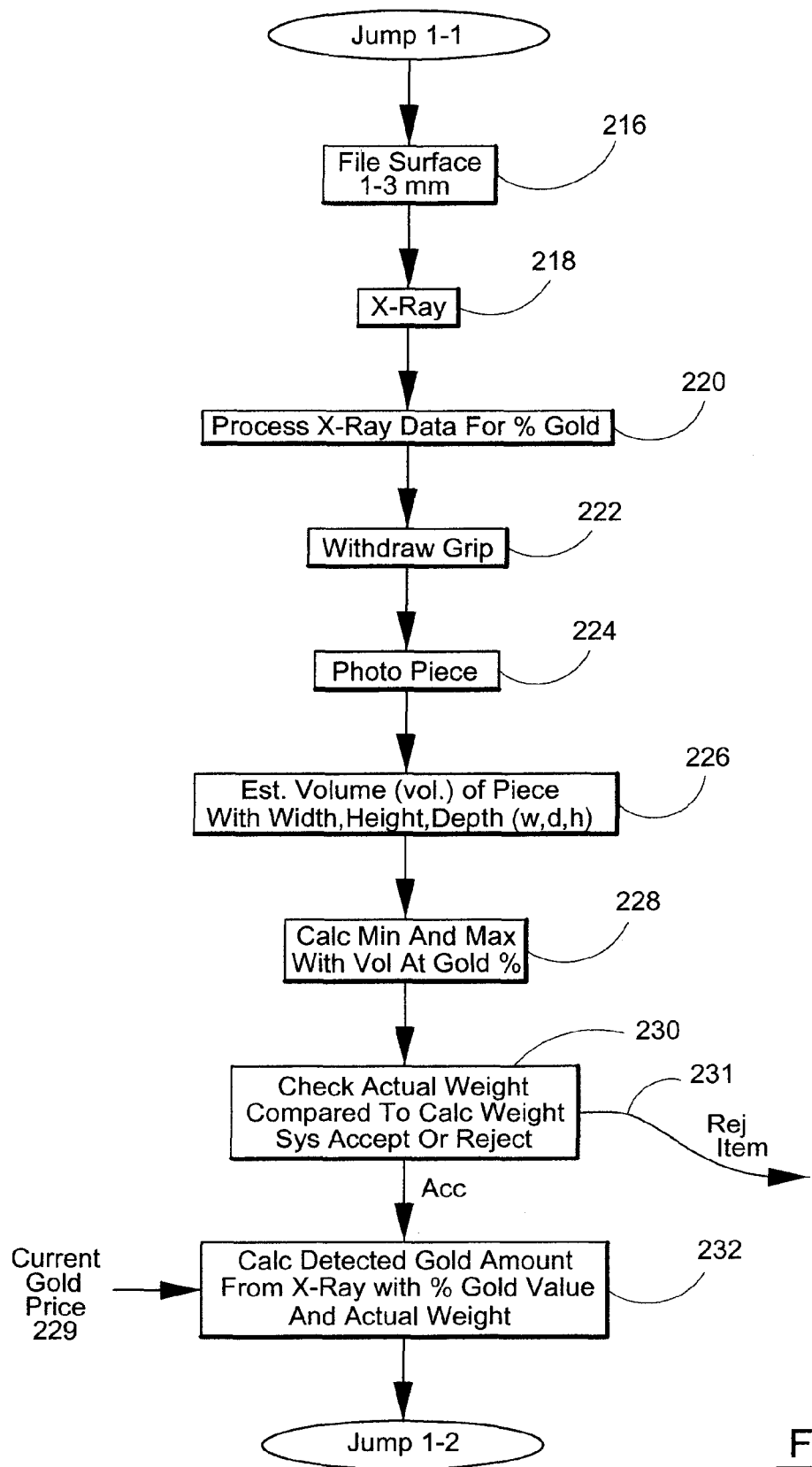

FIG. 6A is joined to FIG. 6B at jump point 1-2. In step 216, the machine and method uses a small jewelers file to file a 1-3 mm. slot or groove of the piece under study. Step 218 x-rays the piece. Step 220 processes the x-ray data and determines the percentage of gold or other precious metal of the piece under study. This is an assaying step. Step 222 withdraws the grip which retains the piece during filing operation. Of course, the grip may be withdrawn prior to x-ray step 218 and assay 220. In step 224, another image or multiple images of the piece are obtained. In this manner, the customer and the system operator has pre-assay pictures and post-assay pictures of the piece under study. In step 226, the computer program can estimate the volume of the piece by determining, through edge detection and image processing, the width, height and depth (W, D) of the item. In step 228, the system calculates the minimum and maximum volumes for the item the percentage of gold with the x-ray assay data. The percentage of gold can be estimated at 14K, 18K and 12K dependant upon the assay data. In step 230, the estimated weight given the estimate volume multiplied by the predetermined gold percentages is checked against the actual weight. If the actual weight of the piece varies considerably beyond the 12K, 14K and 18K estimated volume-weight, the system rejects the item in step 231. If the actual weight of the item falls within the estimated thresholds, the acceptance path leads to step 232. In step 232, the system calculates the actual gold amount from the x-ray based upon the assayed percentage of gold and the actual weight. Also, the machine and method accepts information regarding the current market price of the gold by input 229. FIG. 7 shows the market data update system.

Figure 6C:
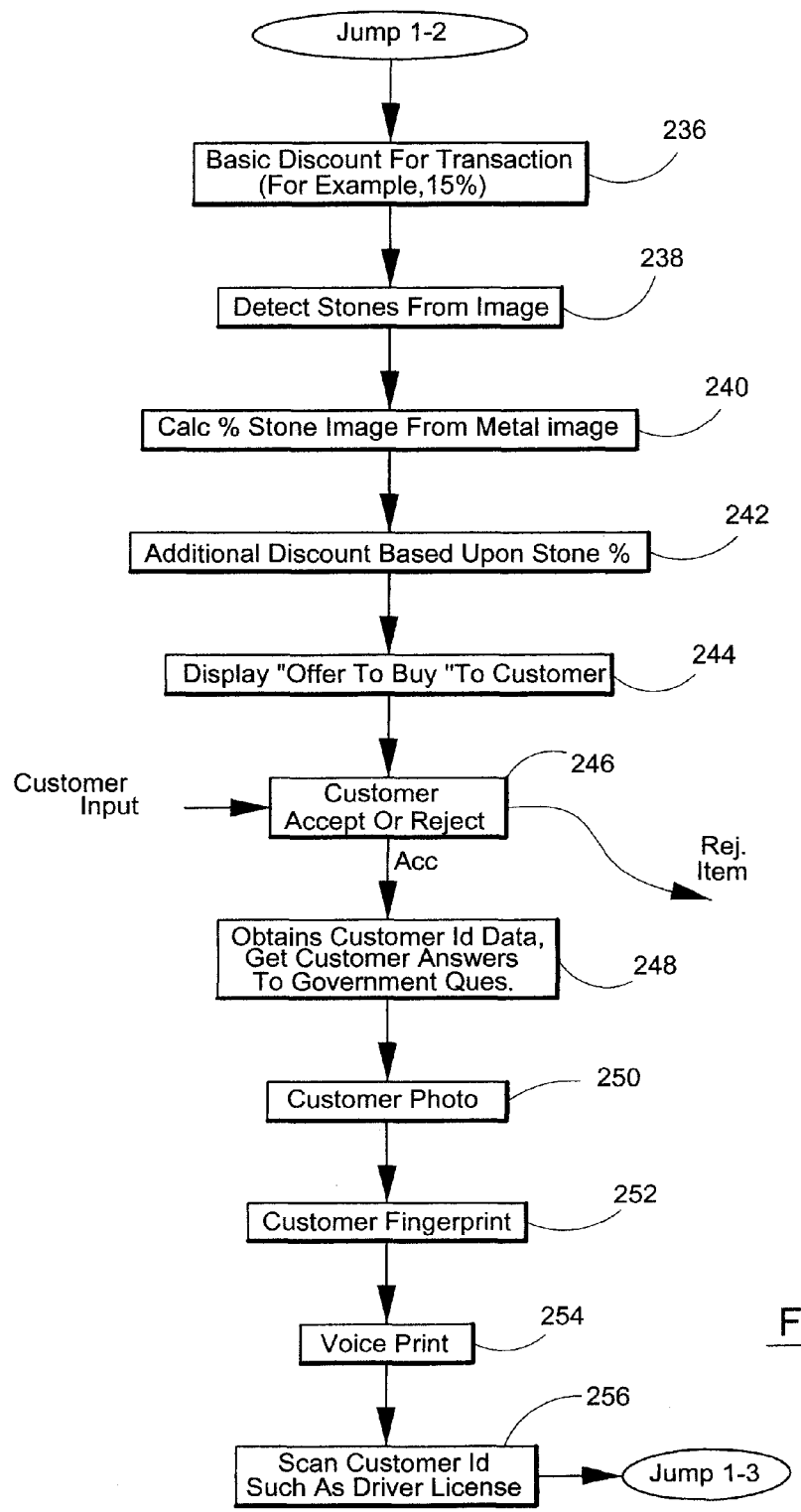

FIG. 6B is coupled to FIG. 6C by jump point 1-2. In step 236, the system discounts from the calculated value of the piece a certain percentage for transaction cost, fraud and other market conditions and operating system or transaction fee costs. As an example, the system may discount the actual price of the precious metal item under study by 15%. The 15% represents profit to the system operator, a set aside reserve for fraud and other transactional costs. A volume error factor may be an additional discount. Step 238 detects the number and size of stones in the image. This is done by obtaining one or more photographs, conducting edge analysis and light reflection analysis and also determining stones by common shapes such as round, oval, marquis, and other image processing techniques. In step 240, the percent of stone image is determined as a ratio of the volume of the piece under study which volume is estimated from step 226. In step 242, the system applies an additional discount to the value of the piece under study due to the presence of stones or jewels. In step 244, an offer to buy is presented to the customer. The offer to buy should be commensurate with similar offers in the local jewelry and pawn business.

When the offer to buy is presented to the customer in step 244, the customer engages and applies an input into the machine 51 and the method in step 246 requires that the customer either accept or reject the item. If the item is rejected, the piece under study is delivered back to portal 54, the lockout door 56 is opened and the customer is permitted to remove piece 55 from the machine. If the customer accepts the offer to buy, in step 248 certain information is obtained from the customer. This information includes identity information, further images and photographs of the customer, credit card information, a fingerprint of the customer and potential an audio voice print of the customer. Therefore, scanner 64 may be used for a driver license scan. Fingerprint reader 68 captures the fingerprint of the user. The machine 50 may also include a microphone to capture a voice print. Camera 60 captures several images of the customer. Therefore, steps 250, 252, 254 and 256 gather all this customer data. The customer data is put in a customer profile which documents all offers and all attempted sales by prospective customers (a fraud detection function). Jump point 1-3 in FIG. 6C leads to FIG. 6D.

Figure 6D:
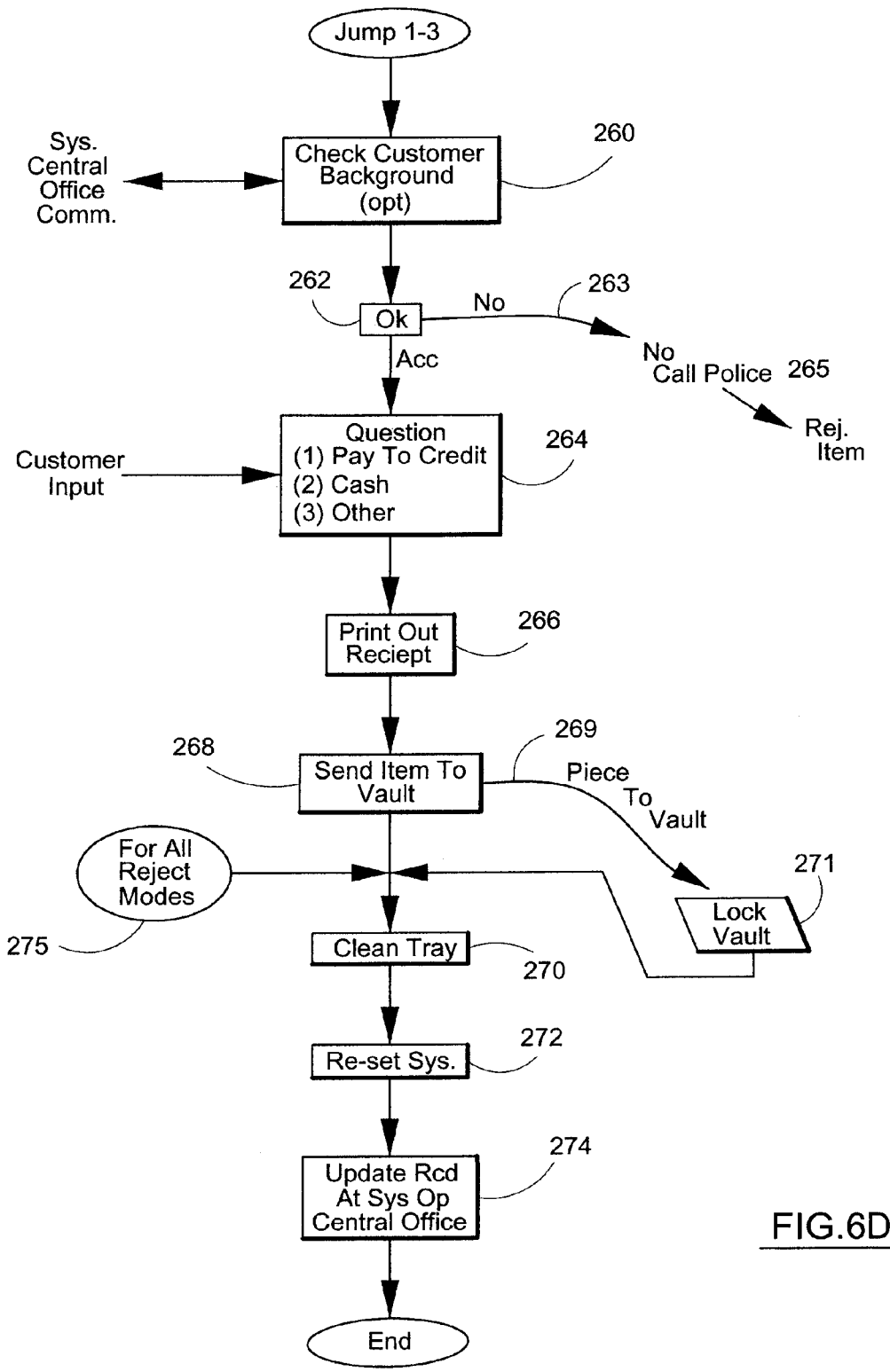

In FIG. 6D, step 260 checks the customer against a potential list of felons. This may involve a communication with the central office as discussed earlier in connection with FIG. 1. This background check in step 260 is optional. Step 262 determines, either by the system operator at the central office or based upon information stored in machine 50, whether the transaction is acceptable. If not, the NO step is taken at path 263 and, optionally, the police are called in step 265 and the item is rejected. A police call in step 265 may be reasonable if the item under study matches data associated with stolen piece database. If the system accepts the background check from step 262, the system executes step 264 which requires the customer to input information regarding how the customer is to be paid. The customer has several options. He or she may be paid by a credit applied to a credit card or a debit card. The credit card or debit card is read by credit card reader 70. Alternatively, machine 50 may have a cash dispenser 72 which dispenses cash. In any event, step 266 prints out a receipt for the customer by printer 74. In step 268, the item under study is placed in vault as noted by vault route 269. Step 271 locks the vault for secure storage. Step 270 cleans the operating tray such that any gold dust from previous operations is no longer affecting the weight of newly submitted items. In FIG. 5, station 4 at time t-8, fan 140 is operated which blows the gold dust from operation platform 135. Other techniques and methods for cleaning tray 135 may be utilized. For all other rejected modes as noted in step 275, the tray is cleaned. In step 272, the system is reset. In step 274, an update is provided to the central office regarding the completed transaction. Further, customer profile data may be uploaded to the central location.

The GBM can be configured to process gold, silver, and platinum. Therefore, all references herein to gold are equally applicable to other precious metal. The following table lists examples of items to be tested and potentially purchased at the GBM. Some weight and volume and size limits apply.

TABLE

| Types of Items |
| --- |
| Bracelets |
| Necklaces |
| Rings |
| Pendants |
| coins |
| Brooches |
| cuff links |
| Earrings |
| Bullion |
| Gold Bars |
| Eating Plates |
| Knives |
| Forks |
| Spoons |
| Pins (large ornamental jeweled pins) |
| Money clip |
| body Jewelry (piercings) studs, rings |
| Dental teeth |
| gold, silver, or platinum |

Currently, item size limits are 3 inches maximum, ⅙ inches minimum; minimal size limits: ¼ inch length, ¼ inch height, ¼ inch depth; maximum size limits: 3 inches, 12 inches in length, 6 inches in height; and weight limits are 1 g. to 1-2 kg.

Since stones weigh less, they do not greatly effect the value of the piece. If the stones are less than 20% of the volume (estimated by the photo images), then an additional discount of 5% is not unreasonable. If stones are more than 20% of the volume, the piece may be rejected by the system. The fraud typically arises with a weight that is greater than the computed estimated weight based upon gold % and an estimated volume.

Gold buying parameters include: the current (daily posted, weekly average or monthly average) price of gold, the discount rate for the gold buying system and the transaction fee for particular gold buying machine.

Figure 8:
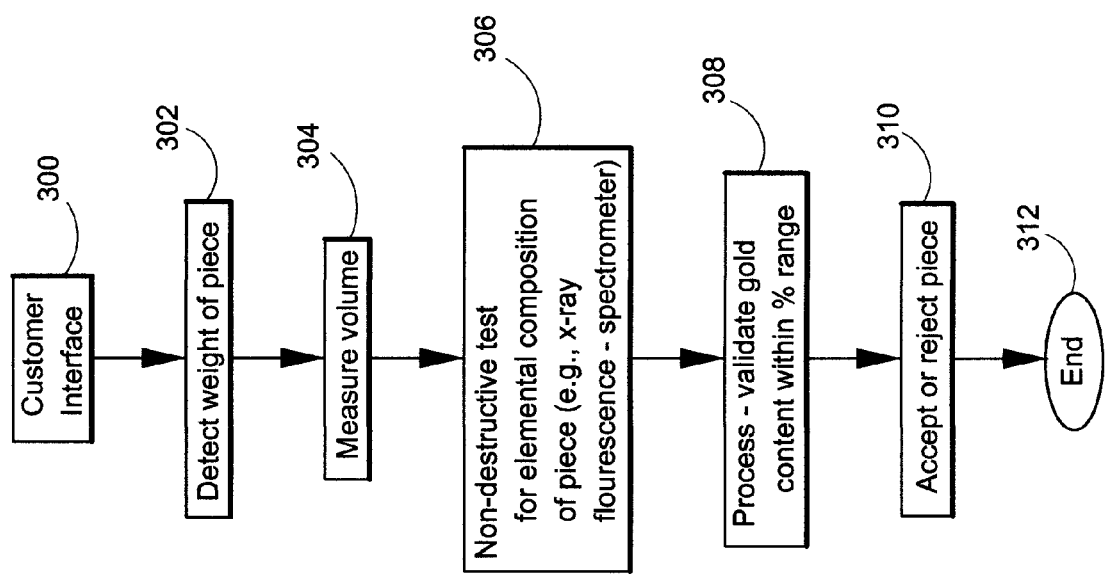
FIG. 8 diagrammatically illustrates a flowchart showing the major modules for processing the gold bearing piece or the precious metal bearing piece.

FIG. 8 diagrammatically illustrates the major process steps and modules for the gold buying or precious buying metal machine. Module 300 recognizes that the customer must have an interface with the gold buying machine to gather customer data regarding the piece offered for sale. The term "gold buying machine" or "GBM" refers to both (a) a machine that buys gold bearing items and pieces and (2) a machine that buys items containing precious metals such as gold, silver or platinum. The invention is not limited to gold items.

Step 302 detects the weight of the piece. Step 304 measures the volume of the piece. Step 306 is a non destructive testing (NDT) of the piece to determine the elemental composition of the piece, such as with an X-ray fluorescence spectrometer. Other non destructive testing (NDT) apparatus may be used. The term "elemental composition" refers to gold, lead, silver, platinum, elemental iron and other constituent metals that may be detected in the piece subject to spectral analysis. X-ray spectrometers develop data indicating a percentage of the elemental composition of the piece under study, and the percentage of the elemental composition to the piece as a whole (x % gold; y % lead, z % silver, etc.).

In step 308, a computer based process computes the gold content of the piece under study (weight in grams) within a predetermined error range. In other words, the precise amount of gold by weight is estimated based upon the detected measurements. The spectrometer is a surface scan of the piece and therefore an elemental analysis of the interior elemental composition of the piece is limited. In step 310, the GBM accepts or rejects the piece and the process ends in step 312.

It should be noted that the order in which the item is processed by the GBM can be altered as necessary based upon the machine structure. Therefore, the NDT testing in step 306 may occur before the weight detection step 302. Volume measurement 304 may be after the NDT elemental step 306.

Figure 9:
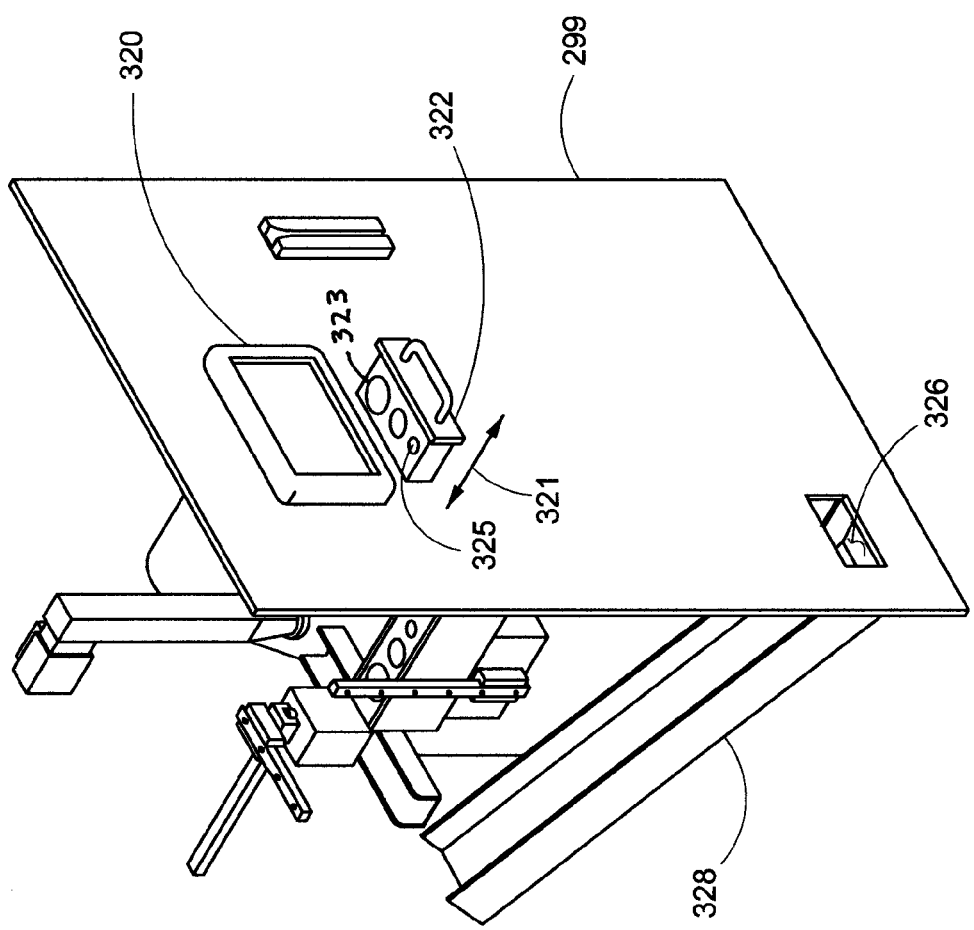
FIG. 9 diagrammatically illustrates another embodiment of the gold buying machine or precious metal buying machine with a volume displacement measuring system.

FIG. 9 diagrammatically illustrates another embodiment of the present invention. The housing has a front face 299 and this front face includes a customer or user display 320. The housing shields the entire mechanism. The customer places the piece subject to study in extendable drawer 322. More specifically, the user places the piece subject to the buy operation in depression 323 or depression 325. FIG. 9 shows an intermediate size depression in drawer 322. Housing face 299 also includes a return portal 326. Items which are rejected by the machine fall down chute 328 and are available for the user at return portal 326. In this manner, rejected items are delivered to the customer.

Figure 10:
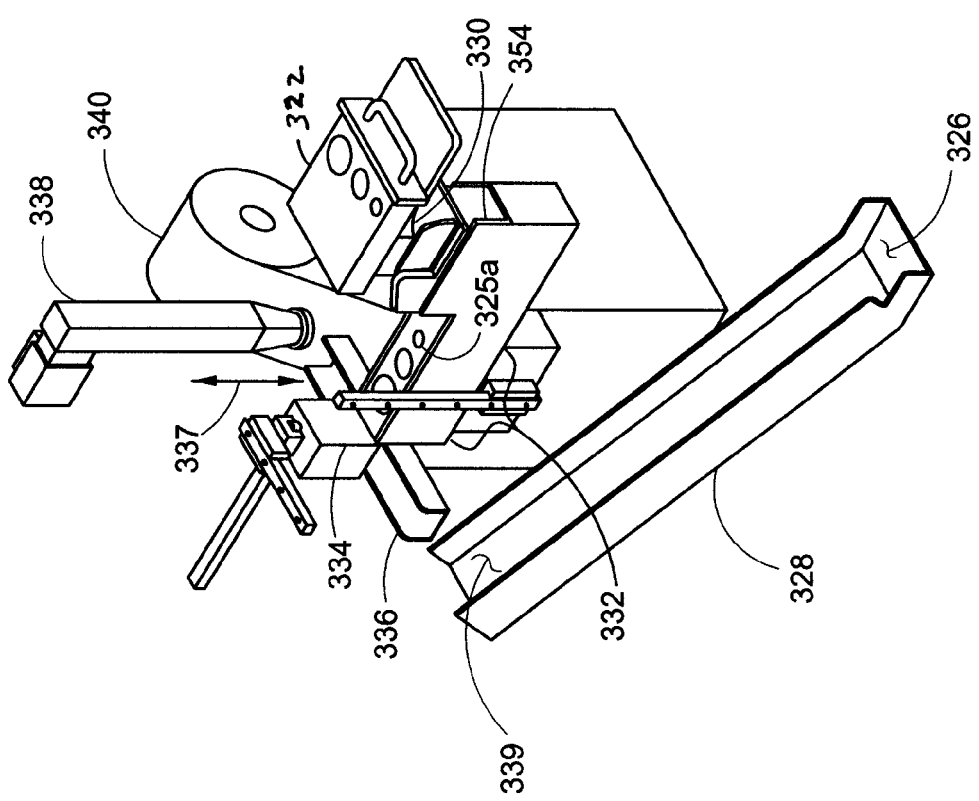
FIG. 10 diagrammatically illustrates internal modules and components of the embodiment of the gold buying machine or precious metal buying machine shown in FIG. 9.

FIG. 10 diagrammatically illustrates the major modules for the supplemental embodiment of the invention. Drawer 322 is pushed inboard into the housing to the back side of front face 299 (FIG. 9) by the user. A mechanical pull may also be employed by the GBM. In one embodiment, the weigh station 330 is beneath the drawer 322. A volume detection appliance is located in machine region or module 332 of the GBM. The NDT X-ray detection device is located downstream of the volume appliance at location 334. Effectively, there is a movable block which slides in U-shaped channel 354. The block first carries the piece under study, then pushes the piece to the volume appliance. The block moves the piece through the channel 354. Opening 325a is associated with the first in line volume detection chamber. After the volume detection appliance 322, the block further pushes the piece under study near the X-ray detection device 334.

Once the spectrograph of the piece is taken, the computer based processor processes the volume data and the composition elemental data, and the machine either accepts the piece under study thereby causing the rocking chute 336 to move to the right in FIG. 10 or downwards in the arrow direction 337 to deposit the piece into a packaging and sealing appliance. The sealing and packaging appliance includes a roll of paper or plastic bags 340 and a sealing mechanism 338. Beneath the sealing appliance 340, 338, is a vault which is not shown in FIG. 10.

Alternatively, the rocking chute 336 may be replaced by controlled access chutes or passages to either (a) return the goods to the customer or (b) place the goods in the vault. The rocker could be replaced by other channeling mechanisms.

If the piece under study is rejected by the GBM, the rocking chute 336 moves upwards in the direction of arrow 337 thereby dropping the piece under study into upper region 339 of return chute 328. Ultimately, rejected piece appears at customer rejection port 326.

Figure 11:
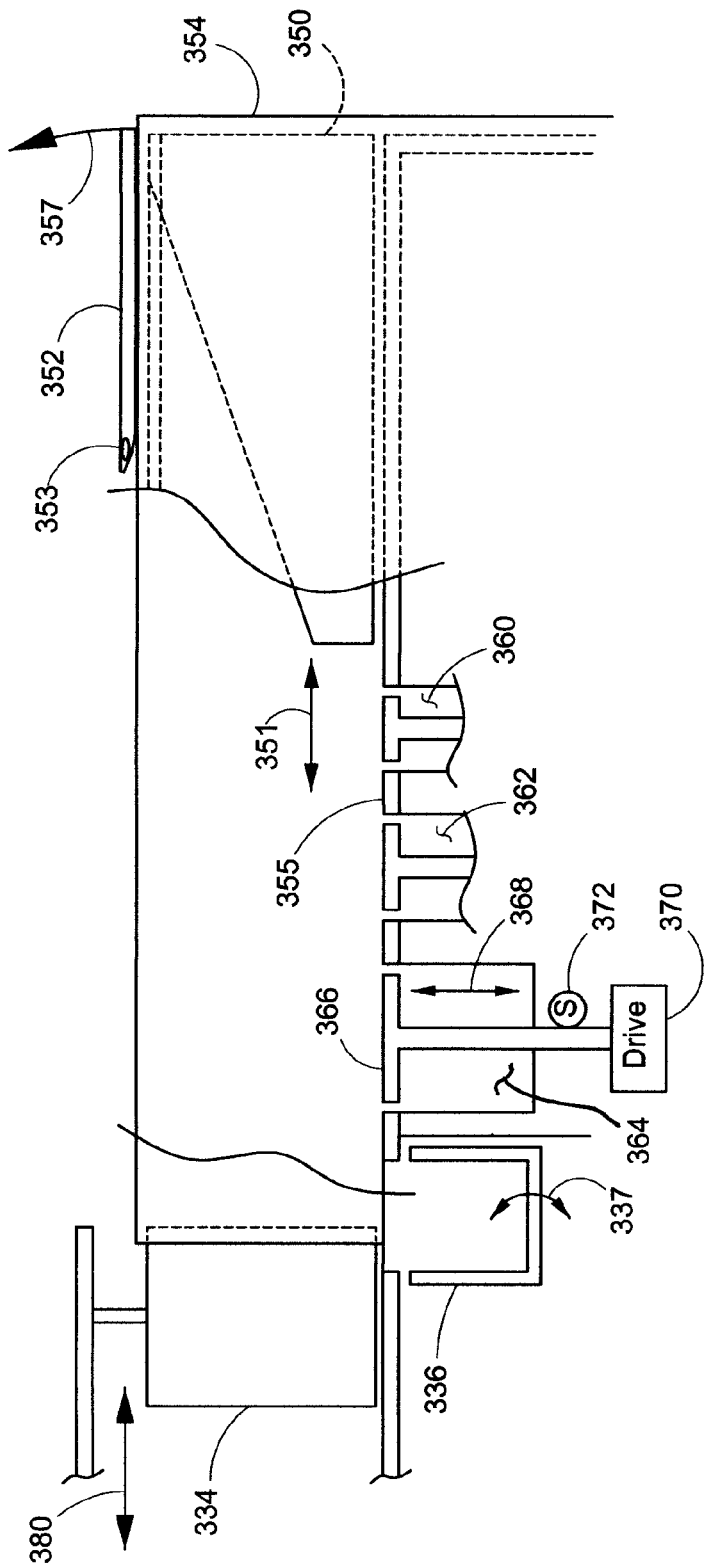
FIG. 11 is a detail of the gold buying machine particularly showing the volume displacement appliance (a broken away view).
Figure 12:
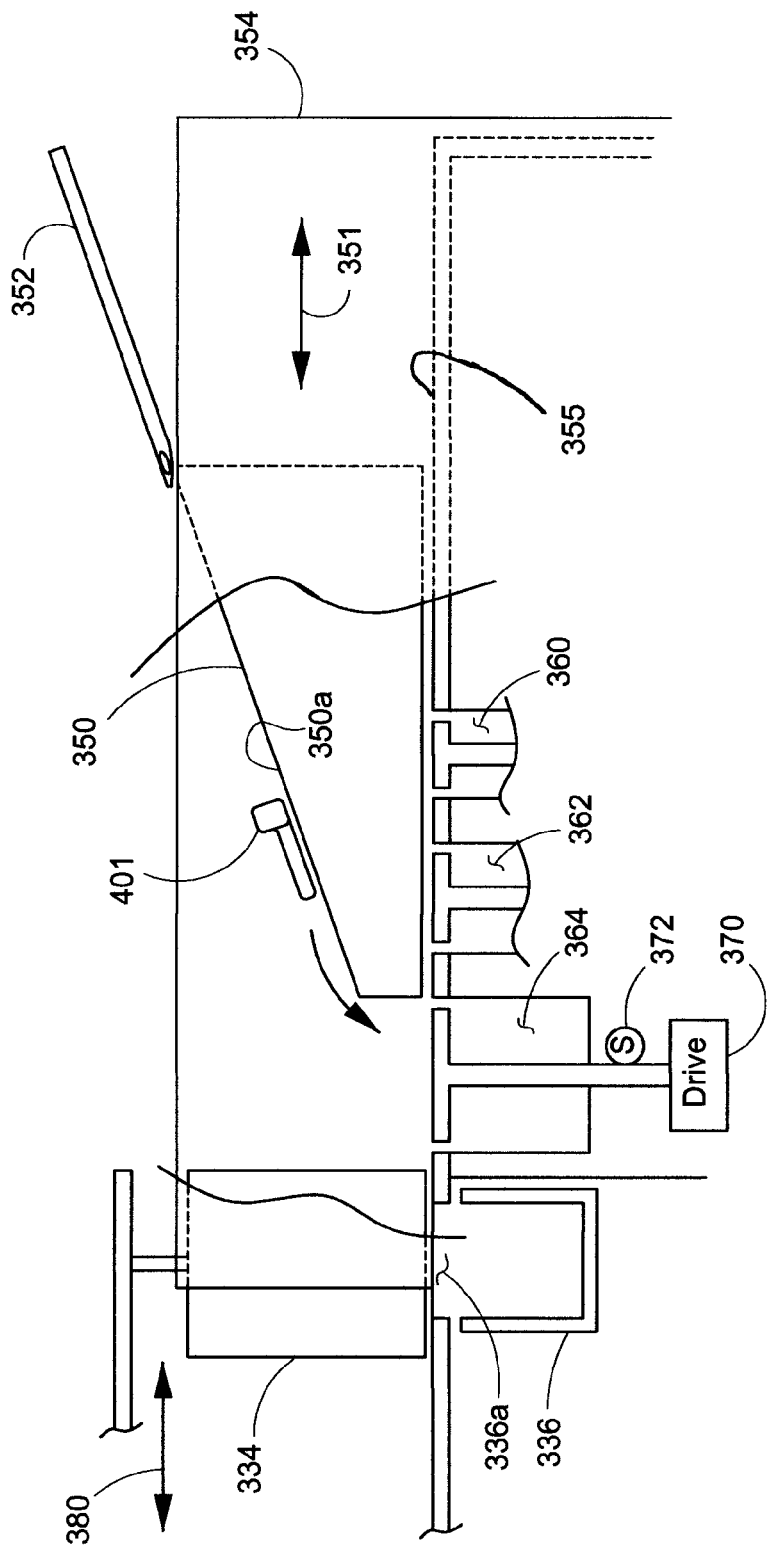
FIG. 12 is a view of the volume displacement appliance in operation.
Figure 13:
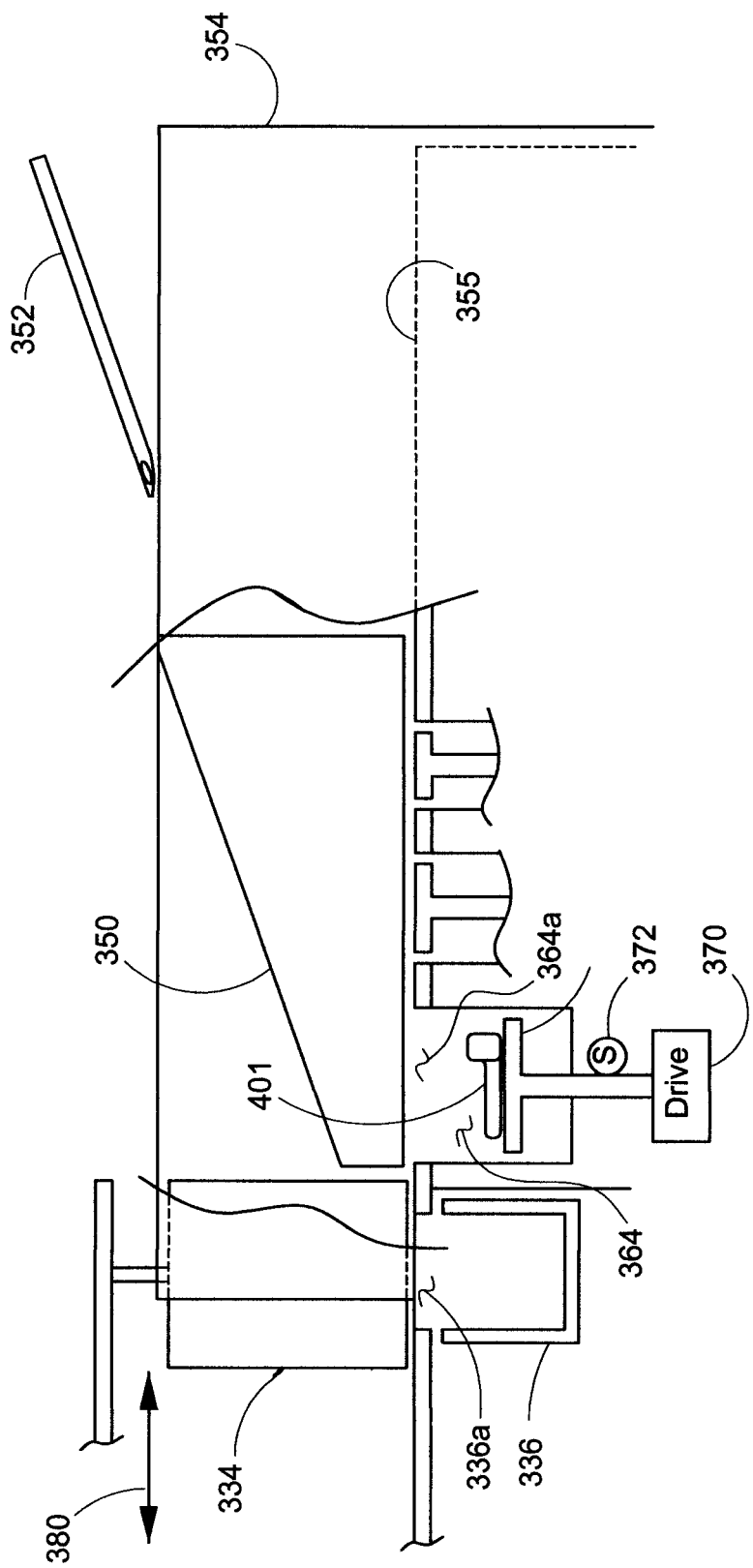
FIG. 13 diagrammatically illustrates another operational view of the volume displacement appliance.

FIGS. 11-13 diagrammatically illustrate various operational positions of the volume detection appliance. The U-shaped channel 354 is shown as a broken-away view in FIG. 11. A movable block 350 moves to the left in FIG. 11 as shown by arrow 351. The piece under study is initially placed on a moving platform 352 above the block 350. In one embodiment, the moving platform 352 pivots about pivot point 353 in the direction shown as arrow 357. This causes the piece to slide down the platform and onto the sloped surface of the block 350.

In the illustrated embodiment, there are three volume displacement chambers 360, 362 and 364 (chambers 360, 362 separated by stationary platform 355). As best shown with respect to large volume detection chamber 364, a piston with a piston head 366 moves up and down as shown by arrow 368. The piston is driven by driver 370. A positional encoder sensor S 372 detects the position of the piston and the piston head 366 in chamber 364. Once the volume is measured by the correctly sized volume displacement appliance (effectively chambers 360, 362, 364), the piece under study is pushed towards the left in FIG. 11. The NDT testing then operates on the piece. Thereafter, the piece is deposited in rocking chute 336. The rocking chute 336 moves back and forth as shown by double headed arrow 337.

The X-ray spectrograph 334 is at the far end of the processing channel 354. Spectrograph 334 can move left and right in channel 354 as shown by arrow 380.

In FIG. 12, piece 401 is initially was positioned at platform 352 but has slid downward along slope surface 350a of block 350.

FIG. 13 also shows the volume displacement appliance in operation. Piece 401 originally was on platform 352 but has slid down slope surface 350a of movable block 350. Block 350 moves in the channel 354 as shown by arrow 351. Block 350 has moved over volume displacement testing and measuring chambers 360 and 362 and the terminal end of block 350 is near the opening of chamber 364. Additionally, NDT spectrogram 334 has moved to the right to block or close the opening 336a of rocking chute 336.

In FIG. 13, block 350 has moved to close opening 364a of volume displacement testing and measuring chamber 364. In this manner, a seal is created between the lower surface of block 350 and chamber 364. The piston 366 is moved such that a certain pressure is established in chamber 364. The difference of the position of piston 366 is measured by encoder sensor S 372. Piston 366 is moved by driver 370. A pressure sensor on or adjacent chamber 364 (not shown) monitors the pressure in the sealed chamber 364. As discussed later, the volume differential caused by study piece 401 can be measured by the difference of piston 366 and chamber 364. The difference between an empty chamber 364 at a predetermined pressure and the position of piston 366 is used as a base line. When item 301 is in sealed chamber 364 and the chamber is placed at the same predetermined pressure, piston 366 is at a different location with respect to its position in chamber 364. Encoder position sensor 372 senses the position of the piston.

In a data processing sense, the GBM uses the spectral analysis to (a) identify the elemental metals on the piece under study by scanning the surface, many times, and (b) identifies the percentages of the elemental components. For example, 12% gold, 15% silver, 25% lead, etc. The computer based processor takes the lowest "gold" percentage from the x-ray machine. Since the piece has been weighed, the processor computes an estimated gold weight, in grams, based upon the x-ray scan. This is an estimated value because the scanner cannot deeply penetrate the piece. The x-ray is designed to penetrate a reasonable portion of the surface of the material to get through any plating. The x-ray scan a large surface portion of the material. The scans are recorded and complied. The scans look for variations in gold percentage using the smaller percentage for the gold content calculation. It should be noted that the scan data, sometimes called herein elemental data, may be averaged or weighted by an algorithm. The X-ray fluorescent technology scans material and determines elemental percentages. This technology does not consider lighter elements, such as gem stones. The x-ray scans a large portion of the material and look for variations in gold percentage using the smaller percentage for the gold content calculation.

Weight measurement is recorded in grams (g). The volume measurement seeks to measure the complete volume of the piece.

In one processing embodiment (there may be other algorithms that could be used), each elemental percentage (% gold, % silver, % lead, % copper) is used to compute a "calculated volume" or CV. In other words, 1 g. of gold will occupy a certain volume. Therefore, the elemental percentages can be used to calculate an expected CV based upon (a) the weight of the object; (b) the density of the element and (c) the volume associated with that elemental weight. Other algorithms may be used to process an expected volume.

The volume of the piece is measured with reasonable accuracy by the volume displacement appliance. The measured volume is MV.

The current embodiment uses two Test Formulas. Test A: If CV<MV, use the MV and adjust the elemental percentage. Test B: If MV<CV, use the MV measured volume and the element percentage.

TABLE

| Weight per Unit Volume |
|---|
| Gold 19.32 grams/cc |
| silver 10.49 grams/cc |
| copper: 8.92 grams/cc |
| zinc: 7.14 grams/cc |
| Lead: 11.30 g/cc |

| Processing Example A |
|---|
| Gold 25% - by scan |
| Silver 25% - by scan |
| Copper 25% - by scan |
| Zinc 25% |
| Filler 0% |
| MV 1.25 cc |
| CV 1.00 cc |
| 13 grams - measured weight |
| ?? grams Gold |

The difference in volume is the key indicator. Gold is more dense than most other elements, hence smaller volumes. If the sample has a larger volume, then it must be other material, so the element percentages are adjusted and reduced assuming the extra volume is a material at the least % the weight of gold, that is at least 10 g/cc (gold being 19.32 g/cc).

| Processing Example A - Recomputed |
|---|
| Gold 20% - by scan |
| Silver 20% |
| Copper 20% |
| Zinc 20% |
| Filler 20% |
| MV 1.25 cc |
| CV 1.00 cc |
| 13 grams total |
| 4.83 grams Gold - Estimated Resultant |

If MV<CV, then the processing uses the MV measured volume and the element percentage. The actual volume is less than the material is very dense. Some limits should be placed on this process. The system may be calibrated. If it is close to the same volume, then the element percentages are correct.

If CV<MV, this may be a fraud attempt by the customer.

The following examples may contain gem stones or other non-detectable fillers, including plating. If the volume difference is large in CV<MV, this may be a fraud attempt, the sale should be voided and that customer would have a fraud attempt added to their profile.

| Processing Example B |
|---|
| Gold 25% |
| Silver 25% |
| Copper 25% |
| Zinc 25% |
| Filler 25% |
| MV 2.00 cc |
| CV 1.00 cc |
| 15 grams total weight |
| ?? grams Gold |

The present embodiment uses a volume displacement process to measure the volume of the piece under study. The measurement utilizes pressurized air (or other gas) to determine difference in air volume. When air is pressurized to 2 atmospheres the volume is reduced by one-half (½). When an unknown sample is introduced into the measurement chamber, the volume of air will be reduced by the sample volume. Once the pressure reaches 2 atmospheres (29.7 psi), the volume of air is reduced to one-half, and monitoring the movement of a piston in a properly calibrated chamber will reveal, by an algorithm, the volume of the unknown sample because the volume of the unknown sample does not change due to the pressure change to 2 ATM.

One embodiment of the system is calibrated at one standard atmosphere (ATM). The delta from the local pressure will be used to calibrate the proper pressure required to reduce the volume in the test chamber by the desired amount. The discussion herein of operation at 2 ATM is an arbitrary selection to describe operational aspects. Specific design points (the base ATM pressure, the key differential positions and volumes, etc.) are subject to change. It should be noted that the machine can drive the piston to a predetermined position, and then measure pressure rather than driving the piston to a predetermined pressure and then measuring displacement. Recent studies project that the "drive to position" is more accurate due to the linearity of the pressure sensors used.

If a cylindrical calibration chamber with 2 cm diameter and an area of 3.14 cm is used with a piston with a 10 cm elongated cylindrical chamber length, the process moves the piston to 2 atmospheres; records distance; the air volume is reduced by ½ and the piston distance position should be 5 cm. If the piece, having an unknown volume is in the chamber, then the differential position of the piston with the chambered piece can be used to calculate the actual volume of the piece.

The air piston is driven with a high accuracy servo and positions are measured with a linear encoder.

Figure 14:
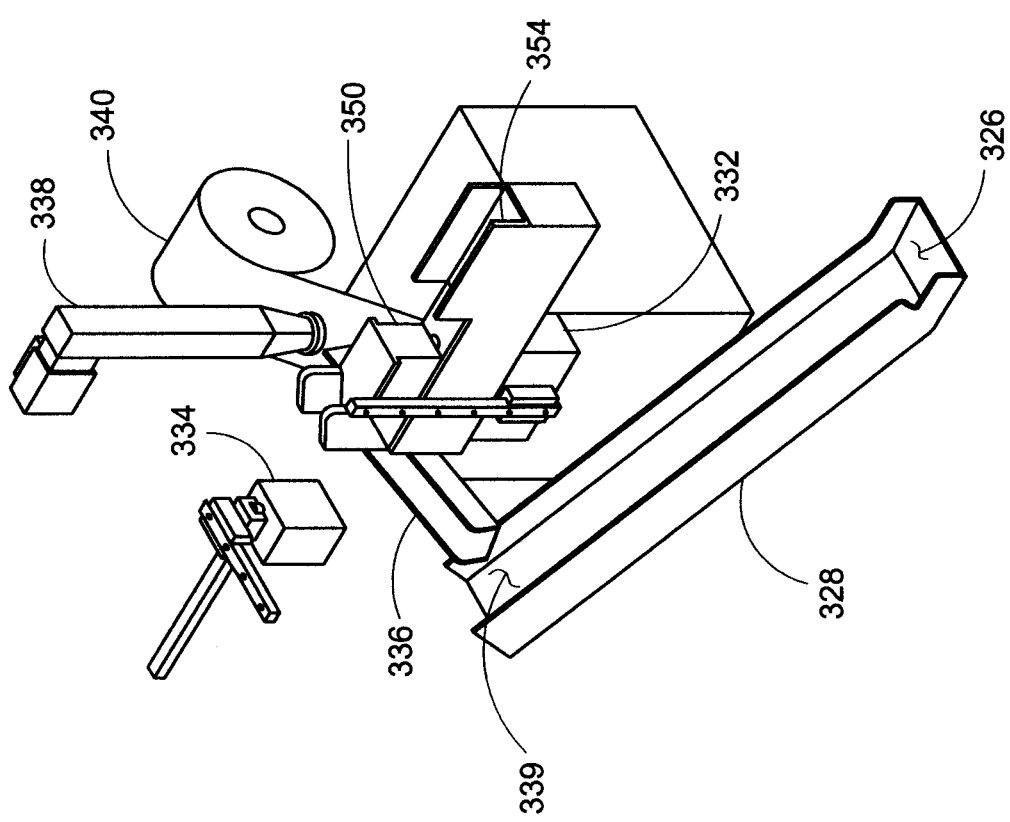
FIG. 14 diagrammatically illustrates an embodiment of the gold buying machine or precious buying machine in a rejection mode.

FIG. 14 diagrammatically illustrates the embodiment of the machine in a rejection mode. In this situation, the item under study has been rejected and rocking chute 366 has moved such that it output the piece into upper region 339 of return chute 328. The piece falls down by gravity to customer return area 326.

The volume measuring appliance could use a fluid to measure volume. An empty chamber may be flooded with a known volume of fluid (such as water) and then, after the item is placed in the chamber, the same volume of fluid may be used. The difference in the column of water indicates the volume of the item under study.

Further in a pneumatic measurement, rather start with air at 1 ATM and then pressurize the loaded chamber (loaded with the item), the volume displacement appliance may use a vacuum. The differential position of the piston, when used with a vacuum, also indicates the volume of the item under study.

Additionally, the volume displacement appliance may be calibrated for more accurate measurements. Further, the item volume measurement may be activated first under a pressure displacement operation and then under a vacuum displacement operation.

Throughout the description of the present method and system, abbreviations are sometimes utilized describing certain features. The following Abbreviations Table lists these items.

ABBREVIATIONS TABLE

| | |
|---|---|
| w, h, d | width, height, weight |
| acc | accepted, such as a customer accepts an offer to buy |
| admin | administrator |
| ASP | application service provider - server on a network |
| API | application program interface |
| ad | advertisement |
| bd | board |
| calc | calculate |
| cam | camera, maybe a common camera or an x-ray camera |
| cat | category |
| CD-RW | compact disk drive with read/write feature for CD disk |
| ck | check or confirm |
| comm. | communications, typically telecommunications |
| CPU | central processing unit |
| cmd | command |
| cnt | content |
| cr cd | credit card or debit card |
| db | data base |
| disp | display or code |
| disp'r | dispenser, such as a unit to dispense or return the item |
| doc | document |
| dr | drive, e.g., computer hard drive |
| descrpt | description |
| dy | day |
| equip | equipment |
| empl'r | employer |
| empl'ee | employee |
| ent | entertainment (while the GBM operates, entertainment may be displayed to the customer |
| err | error |
| est | estimate |
| freq | frequency |
| fnc | function, as in system function |
| geo | geographic location or code |
| gen | general |
| gov'nt | government, as in government regulations |
| hist | historic as in historic session records |
| id | identity card |
| I/O | input/output |
| IP | Internet Protocol such as IP address |
| incr | increase or increment |
| K | karat as in a Karat of gold |
| kypd | keypad, maybe mechanical or virtual, touch screen keys |
| loc | location |
| max | maximum |
| mem | memory |
| mess | message as in SMS or text message |
| mgr | manager |
| min | minimum |
| mth | month |
| obj | object, for example, a data object |
| opt | optional step or module |
| pgm | program |
| P/W | password |
| pg | web page |
| pix | picture, usually digital picture or image |
| pmt | payment |
| pmpt | prompt, as in prompt a user to input data |
| pp impress | per page impression or view |
| prn | print |
| prnt | printer or to print |
| Q | quantity |
| quest | question |
| rcd | database record or record profile |
| re | regarding or relating to |
| read | a reader, such as a credit card reader |
| reg'd | registered as in reg'd user |
| rej | reject |
| rel | relevancy or relevant |

ABBREVIATIONS TABLE-continued

| | |
|---|---|
| reqt | request |
| rev | review |
| rpt | Report |
| sch. | search |
| sched | schedule |
| sel | select or selector |
| si | sillets interface modules |
| sig cond | signal conditioner |
| st | station |
| sys | system |
| sys oper | system operator |
| sess. | session |
| t | time |
| tele-com | telecommunications system or network |
| TS | time, date stamp |
| txt | text |
| URL | Uniform Resource Locator, x pointer, or other network locator |
| vid | video |
| vol | volume |
| wk | week |
| wt | weight |

FIG. 7 diagrammatically illustrates the global telecommunications system or Internet 10 which enables communication and data transport between a plurality of relatively independent GBM computer systems 12, 14a, 16a, 18, 51 (FIG. 7). Communications System 10 may include cellular or wireless comm channels to the gold buying machines. A indicated earlier, each gold buying machine includes a computer system, therefore, systems 12, 14, 16, 51 in FIG. 7 depict the computer systems in the gold buying machines. The computer system 30 includes monitor 12 with display 22, input device or keypad 24, input device or mouse 26 and processor unit 28. The Processor unit includes a central processing unit or CPU, memory 32 and an input/output or I/O device 34. It should be appreciated that memory represents many types of data storage including hard drives, volatile and non-volatile memory, and removable drives. Also, I/O represents a plurality of input/output devices which are utilized to couple items which are peripheral to processing unit. I/O is connected to Internet 10. The Computer may be a laptop computer which can easily be disconnected from Internet 10. The Computer may be an administrative computer which assists in the overall control and operation of the system by the Sys Op and the method described herein.

In a preferred embodiment, the system and method are deployed on Internet 10 via a computer system server 18, 20. The telecom system may be wired, wireless or a combination of both. Server 20 includes CPU 36, memory 38 and I/O 40 and is coupled to Internet 10.

In a different embodiment of the present invention, the system or processing system or method may be partially or entirely carried out with the use of a telephone communications center 42. The telephone communications center typically includes one or a plurality of computers 44 and one or more telephones 46. Human operators may answer telephone inquiries from a customer at a gold buying machine. Also, the Tele Comm may be fraud detection system which in real time can stop the gold buying transaction.

For example, once the customer's id is scanned by the gold buying machine, if the id matches a "wanted criminal" in a database (as posted by the police authority), then the Tele Comm center may cancel a gold buying transaction in the middle of the transaction. Also, the Tele Comm Center may notify police of the incident.

The input of information can be facilitated by a person at telephone communication center. For example, computer could display questions which the operator could audibly present via telephone to a caller. The operator would input into computer the caller's answers and system could generate appropriate responses to complete data entry forms for the system.

The information obtained by computer is generally stored in server 20. Thereafter, the information is processed by server 20 and the output information representing processed data is delivered via Internet 10 or Tele Comm Sys 10, and ultimately to computer 14, 16. Data input by a customer maybe sent to the server 20 which returns further web page data. The web page may be informational to the buyer at the gold buying machine.

Although the system and method is described generally for use in conjunction with Tele Comm Sys 10, the system and method could be utilized by a single computer, such as laptop operated by a Sys Op or a jewelry store or pawn shop owner. Laptop could be utilized with a CD-ROM storing a major portion of the data bases necessary to carry out the principles of the present invention. Further, the information processing system could be deployed over a local area network or a wide area network or utilized exclusively in-house by a single company with subsidiaries bidding for a gold buy.

Discussion of Hardware and Software Implementation Options

The present invention could be produced in hardware or software, or in a combination of hardware and software, and these implementations would be known to one of ordinary skill in the art. The system, or method, according to the inventive principles as disclosed in connection with the preferred embodiments, may be produced in a single computer system having separate portions or means for performing the individual functions or steps described or claimed or one or more portions or means combining the performance of any of the functions or steps disclosed or claimed, or may be arranged in a distributed computer system, interconnected by any suitable means as a local area network (LAN) or widely distributed network (WAN) over a telecommunications system (such as the Internet) as would be known to a person of ordinary skill in the art.

According to the inventive principles as disclosed in connection with the preferred embodiments, the invention and the inventive principles are not limited to any particular kind of computer system but may be used with any general purpose computer, as would be known to a person of ordinary skill in the art, arranged to perform the functions described and the method steps described herein. The operations of such a computer, as described above, may be according to a computer program contained on a medium for use in the operation or control of the computer, as would be known to person of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM or other optical memory storage devices, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

The claims appended hereto are meant to cover modifications and changes within the scope and spirit of the present invention.

What is claimed is:

1. A machine for buying a gold-bearing item from a consumer comprising:

a housing structure having a vault within said housing;

a portal in said housing leading inboard to a plurality of processing stations in the interior of said housing, said portal adapted to receive said gold-bearing item by the customer;

said plurality of processing stations including:

a weigh station to weigh said gold-bearing item and to generate representative weight data for the item;

an x-ray spectrometer station wherein said spectrometer detects constituent elements present in said gold-bearing item and generates representative elemental data including gold elemental data;

a volume measurement station for measuring the volume of said gold-bearing item based upon gas or fluid displacement in a chamber with said item, said volume measurement station generating volume data for the item;

a consumer-visible display electronically coupled to a computer-based processor;

said computer-based processor electronically obtaining said weight data, said gold elemental data and said volume data for the item and approximately calculating the amount of gold by weight in said item;

a plurality of interface modules configured for the consumer on and about an exterior of said housing including an imaging system to capture one or more images of said consumer, an input module configured for obtaining consumer's identity or biometric data, a keypad input interface and a bank card reader adapted to read a consumer's bank card data linked to a consumer's account to be credited for the sale of said gold-bearing item;

said processor including:

(a) a module determining a discounted market value for said gold-bearing item based upon predetermined exchange rate data, the approximated gold weight and at least one discount factor;

(b) a presentation system for displaying on said display said discounted market value for said gold-bearing item to the customer;

(c) an acceptance module including means configured for accepting an offer to sell instruction from the customer and thereafter generating a payment instruction to compensate the customer and for generating a vault storage event command;

(d) a rejection module adapted to negate said acceptance module upon either a customer's request or a detected error signal, said rejection module generating a rejection command; and, (e) an error module configured for generating the error signal based upon either a gold purity fault or a weight fault;

(f) a compiler obtaining and storing consumer's data from said interface modules including consumer image and consumer's identity data or biometric data, said compiler also storing representations of said gold purity fault error signals and weight fault error signals;

a transport system, as part of the gold-buying machine, for delivering said gold bearing item to said weigh station, to said spectrometer station, to said volume measurement station and, upon said vault storage event command to deliver the item to said vault, and upon said rejection command to deliver the item to an item return port in said housing.

2. A machine for buying a gold-bearing item as claimed in claim 1 wherein the volume measurement station is an gas or air displacement appliance.

3. A machine for buying a gold-bearing item as claimed in claim 2 wherein the gas or air displacement appliance includes a chamber capable of being sealed, which chamber defines a known volume of air when empty at ambient pressure and, when the item is placed in said chamber and the chamber is sealed, and a module configured for changing the pressure in the chamber to a predetermined pressure other than the ambient pressure, a measurement sub-system for measuring a differential volume from the known volume at the predetermined pressure by measuring by a differential position of a piston movable in said chamber, said differential volume caused by said gold-bearing item.

4. A machine for buying a gold-bearing item as claimed in claim 2 wherein the gas or air displacement appliance includes a chamber capable of being sealed, which chamber defines a known volume of air when empty at ambient pressure and, when the item is placed in said chamber and the chamber is sealed, and a module configured for changing the volume of the chamber by moving the piston to a predetermined position which is different than the initial start position, a measurement sub-system for measuring the pressure in the chamber when the piston is at said predetermined position, a differential measurement sub-system for measuring a differential volume from the known volume at the predetermined piston, said differential volume caused by said gold-bearing item.

5. A machine for buying a gold-bearing item as claimed in claim 3 wherein said module configured for changing pressure includes either:
  a source delivering pressurized gas into said chamber or
  a vacuum source for reducing air pressure in said chamber, or
  a piston drive for the piston for compressing air to said predetermined pressure in said chamber,
  the module configured for changing pressure including a sensor for detecting said differential position of the piston.

6. A machine for buying a gold-bearing item as claimed in claim 1 wherein said spectrometer detects constituent elements present in said gold-bearing item and generates representative elemental data for all detectable constituent elements including the gold elemental data and other metal elemental data.

7. A machine for buying a gold-bearing item as claimed in claim 6 wherein the error module generates the gold purity fault based upon the gold elemental data and generates the weight fault based upon a calculated volume using the gold elemental data and other metal elemental data and predetermined density data for gold and for other metal elements.

8. A method for buying a gold-bearing item from a consumer comprising:
  providing a secure housing and a vault disposed in the housing;
  after the consumer deposits the gold bearing item into the housing:

weighing said gold-bearing item and generating representative weight data for the item;

x-raying said gold-bearing item with a spectrometer and detecting constituent elements therein and generating representative elemental data including gold elemental data;

measuring a volume of said gold-bearing item with a gas or fluid displacement method and generating volume data for the item;

capturing one or more images of said consumer, obtaining consumer's identity or biometric data, accepting keypad input from the consumer and accepting consumer's bank card data linked to a consumer's account to be credited for the sale of said gold-bearing item;

with a computer-based processing system which obtains said weight data, said gold elemental data and said volume data for the item:

calculating, as an approximation, the amount of gold by weight in said item with said weight data, said gold elemental data and said volume data;

determining a discounted market value for said gold-bearing item based upon predetermined exchange rate data, the approximated gold weight and at least one discount factor;

displaying, on a user interface, said discounted market value for said gold-bearing item to the customer;

accepting an offer to sell instruction from the customer via said user interface and thereafter generating a payment instruction to compensate the customer and generating a vault storage event command;

rejecting the acceptance based upon either a customer's request or a detected error signal and, in either event, generating a rejection command;

generating the error signal based upon either a gold purity fault or a weight fault;

storing consumer's data including consumer's image and consumer's identity data or biometric data in addition to representations of said detected error signal; and as part of the method, either transporting said gold-bearing item to said vault in the presence of said vault storage event command, or transporting said gold-bearing item to the customer in the presence of said rejection command.

9. A method for buying a gold-bearing item as claimed in claim 8 wherein measuring the volume of said gold-bearing item is a gas displacement method measuring a piston displacement between (a) ambient air in an empty chamber with a known volume and (b) air under a predetermined pressure with a chambered item or air placed under a predetermined vacuum with the chambered item.

10. A machine for buying precious metal items containing gold, silver or platinum from a consumer comprising:
  a housing structure having a vault within said housing;
  a portal in said housing leading inboard to a plurality of processing stations in the interior of said housing, said portal adapted to receive said item by the customer;
  said plurality of processing stations including:
  a weigh station to weigh said item and to generate representative weight data for the item;
  an x-ray spectrometer station wherein said spectrometer detects constituent elements present in said item and generates representative elemental data including gold, silver and platinum elemental data;
  a volume measurement station for measuring the volume of said item based upon gas or fluid displacement in a chamber with said item, said volume measurement station generating volume data for the item;

a plurality of interface modules configured for the consumer on and about an exterior of said housing including an imaging system to capture one or more images of said consumer, an input module configured for obtaining consumer's identity or biometric data, a keypad input interface and a bank card reader adapted to read a consumer's bank card data linked to a consumer's account to be credited for the sale of said item;

a computer-based processor electronically obtaining said weight data, said gold, silver and platinum elemental data and said volume data for the item and approximately calculating the amount of gold, silver and platinum by weight in said item;

said processor including:

a module configured for determining a discounted market value for said item based upon predetermined exchange rate data for gold, silver and platinum, the approximated gold, silver and platinum weights and at least one discount factor;

a presentation system configured for displaying said discounted market value for said item to the customer;

an acceptance module including means configured for accepting an offer to sell instruction from the customer and thereafter generating a payment instruction to compensate the customer and for generating a vault storage event command;

a rejection module adapted to negate said acceptance module upon either a customer's request or a detected error signal, said rejection module generating a rejection command; and, an error module configured for generating the error signal based upon either a purity fault or a weight fault;

a compiler obtaining and storing consumer's data from said interface modules including consumer's image and consumer's identity data or biometric data, said compiler also storing representations of said purity fault error signals and weight fault error signals; and as part of the machine, a transport system for delivering said item to said weigh station, to said spectrometer station, to said volume measurement station and, upon said vault storage event command to deliver the item to said vault, and upon said rejection command to deliver the item to an item return port in said housing.

11. A machine for buying a precious metal item as claimed in claim 10 wherein the volume measurement station is an air displacement appliance.

12. A machine for buying a precious metal item as claimed in claim 11 wherein the air displacement appliance includes a chamber capable of being sealed, which chamber defines a known volume of air when empty at ambient pressure and, when the item is placed in said chamber and the chamber is sealed, and a module configured for changing the pressure in the chamber to a predetermined pressure other than the ambient pressure, a measurement sub-system configured for measuring a differential volume from the known volume at the predetermined pressure by measuring by a differential position of a piston movable in said chamber, said differential volume caused by said item.

13. A machine for buying a precious metal item as claimed in claim 12 wherein said module configured for changing pressure includes either:
a source delivering pressurized gas into said chamber or
a vacuum source for reducing air pressure in said chamber, or
a piston drive for the piston for compressing air to said predetermined pressure in said chamber,
the module configured for changing pressure including a sensor for detecting said differential position of the piston.

14. A machine for buying a precious metal item as claimed in claim 11 wherein said spectrometer detects constituent elements present in said item and generates representative elemental data for all detectable constituent elements including the gold, silver and platinum elemental data and other metal elemental data.

15. A machine for buying an item as claimed in claim 14 wherein the error module generates the purity fault error signal based upon the gold elemental data and generates the weight fault error signal based upon a calculated volume using the gold elemental data and other metal elemental data and predetermined density data for gold and for other metal elements.

16. A method for buying a precious metal item containing gold, silver or platinum from a consumer comprising:
providing a secure housing and a vault disposed in the housing;
after deposition of the item into the housing:
weighing said item and generating representative weight data for the item;
x-raying said item with a spectrometer and detecting constituent elements therein and generating representative elemental data including gold, silver and platinum elemental data;
measuring a volume of said item with a gas or fluid displacement method and generating volume data for the item;
capturing one or more images of said consumer, obtaining consumer's identity or biometric data, accepting keypad input from the consumer and accepting consumer's bank card data linked to a consumer's account to be credited for the sale of said item;
with a computer-based processing system which obtains said weight data, said gold, silver and platinum elemental data and said volume data for the item:
calculating, as an approximation, the amount of gold, silver and platinum by weight in said item with said weight data, said gold, silver and platinum elemental data and said volume data;
determining a discounted market value for said item based upon predetermined exchange rate data for gold, silver and platinum, the approximated gold, silver and platinum weight and at least one discount factor;
displaying said discounted market value for said item to the customer;
accepting an offer to sell instruction from the customer and thereafter generating a payment instruction to compensate the customer and generating a vault storage event command;
rejecting the acceptance based upon either a customer's request or a detected error signal and, in either event, generating a rejection command;
generating the error signal based upon either a purity fault or a weight fault;
storing consumer's data including consumer's image and consumer's identity data or biometric data in addition to representations of said detected error signal; and
as part of the method, either
transporting said item to said vault in the presence of said vault storage event command, or
transporting said item to the customer in the presence of said rejection command.

17. A method for buying a precious metal item as claimed in claim 16 wherein measuring the volume of said item is a gas displacement method measuring a piston displacement between (a) ambient air in an empty chamber with a known volume and (b) air under a predetermined pressure with a chambered item or air placed under a predetermined vacuum with the chambered item.

* * * * *